(12) United States Patent
De La Huerga

(10) Patent No.: US 6,507,837 B1
(45) Date of Patent: Jan. 14, 2003

(54) TIERED AND CONTENT BASED DATABASE SEARCHING

(75) Inventor: Carlos De La Huerga, Milwaukee, WI (US)

(73) Assignee: HyperPhrase Technologies, LLC, Madison, WI (US)

( * ) Notice: Subject to any disclaimer, the term of this patent is extended or adjusted under 35 U.S.C. 154(b) by 135 days.

(21) Appl. No.: 09/590,345

(22) Filed: Jun. 8, 2000

(51) Int. Cl.⁷ .............................................. G06F 17/30
(52) U.S. Cl. ............................................. 707/3; 707/10
(58) Field of Search .............................. 707/3, 5, 6, 10; 714/42; 379/88.21, 88.22

(56) References Cited

U.S. PATENT DOCUMENTS 5,361,346 A * 11/1994 Panesar et al. ................ 707/6
5,867,562 A * 2/1999 Scherer ..................... 379/88.21
6,188,751 B1 * 2/2001 Scherer ..................... 379/88.22

FOREIGN PATENT DOCUMENTS

WO    WO 01/33432 A1    5/2001
WO    WO 01/35714 A2    5/2001

* cited by examiner

Primary Examiner—Diane D. Mizrahi
(74) Attorney, Agent, or Firm—Quarles & Brady, LLP

(57) ABSTRACT

A method and apparatus for facilitating efficient database searching for records referenced by a data reference, the method including examining a data reference and related information to identify content characteristics and non-content characteristics of the data reference and, based the content and non-content characteristic combinations, selecting a sub-set of databases to be searched for data referenced records, ordering the sub-set as a function of likelihood of including relevant records and then searching the ordered sub-set of databases for relevant records.

84 Claims, 7 Drawing Sheets

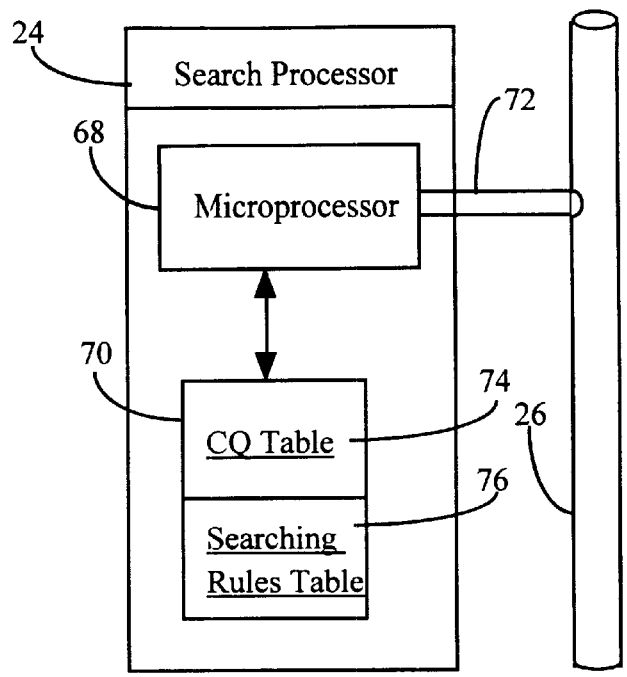

Figure 2

| CQ Table | |
|---|---|
| CCQ-1 term "letter" | |
| CCQ-2 date qualifier, e.g. "on XX/XX/XX" | |
| CCQ-3 term "ecg report" | 82 |
| CCQ-4 doctor qualifier, e.g. "Dr. Bill Thomas" | |
| CCQ-5 patient ID number, e.g. "ID 1234567" | |
| • | |
| • | |
| CCQ-P    recipeint qualifier, e.g. "to _____" | |
| NCQ-1    processor identity that can be used to qualify DR's | 84 |
| NCQ-2    user identity that qualify DR's | |
| NCQ-3    record description information (e.g. creation date) | |
| • | |
| • | |
| NCQ-Q    markup language tags, e.g. XML tags | |

Figure 3

TIERED AND CONTENT BASED DATABASE SEARCHING

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates to electronic search engines and more specifically to a system wherein, when a data reference which references a record is provided by a system user, a processor performs a tiered search of linked databases for the sought record and, depending upon characteristics of the data reference (e.g., content characteristics and other non-content characteristics), limits the search to a specific database/database sub-set or extends the search to additional databases/directories.

Herein, unless indicated otherwise, the term "record" is used to refer generally to electronically stored and accessible data including, among other things, word processor documents, web browser pages, pictures, tables, charts, video clips, audio clips, multi-media presentations, etc. Also, hereinafter, the term "database" will be used to refer to a collection of data stored on an electronic medium while the term "database" will be used to refer to a data construct which resides on a database and which catalogues at least a sub-set of database data in an ordered fashion to expedite database searching.

The data processing industry generally has developed several tools that enable a system user to locate specific records stored on databases linked to workstations. To this end, early computing systems typically included a workstation linked to a single database with separate records stored at specific memory addresses. To access a record, a system user had to provide the precise name of the record to access or the record's address and then a workstation used the provided information to locate the sought record and facilitate access thereto.

Eventually the industry developed networking systems referred to generally as local area networks (LANs) and wide area networks (WANs) which linked several workstations to a plurality of different databases so that a system user could have access to data in many different databases from a single computer. To this end, in addition to providing the exact address on a database or name of a record to locate, a system user also had to indicate the database on which a record was stored so that the processor could locate the record.

With the advent of the Internet, in addition to their proximately linked memories and company wide LAN and WAN databases, many workstations are now linked to virtually tens of thousands of databases via massive electronic networks. In fact database storage is quickly becoming "comoditized" as storage industry leaders construct and service server and database warehouses sometimes referred to as storage area networks (SANs). Thus database storage and support is quickly becoming an outsourced application.

While many advantages are associated with the massive Internet network, the sheer amount of data accessible via the Internet poses many problems. This is particularly true as the boundaries between a "proximate" (i.e. directly connected) workstation memory and Internet databases (e.g., SANs and other portal support databases) become blurred.

Various tools have been developed to help Internet users locate and access records in virtually all network-linked databases. As with vintage systems, to access a record on a proximate database, typically a system user has to specify a database or specify a database on which the record sought is stored. Thereafter, the record name has to be provided and a database managing processor searches for the named record on the database or in the database specified. Where the record is not stored on the specified database, the processor indicates so and the user must select another database or database to search.

In the case of the Internet often a system user does not actually know the exact address or name of the record sought. Instead, the user only knows the general nature of the record sought. To facilitate the task of locating a record and rendering the record accessible, the Internet industry has developed search engine technology whereby a system user can provide a general description of a record sought in a query box. A processor then uses the general description to identify a specific database that likely includes the record sought. Next the processor searches the identified database rendering a list including many different records, each of which may in fact be the record sought. Thereafter the system user can select a record from the list for viewing.

Another tool that has been developed to access records and link related records together is generally referred to as hyper-linking. In hyper-linking schemes text and pictorial references in one record to other existing records may be distinguished and linked to addresses corresponding to the referenced records. By selecting a phrase or image, a user instructs the processor to access the record at the related address and provides the record for review.

Various tools have been developed to enable insertion of hyper-linking references in records for linking to other records. For example, e-mail software and word processors enable a user to enter an Internet address into record text. A processor recognizes the address as a hyperlink address, highlights (e.g., presents the address in a distinct color) the address and facilitates linking to the record stored at the address through selection of the highlighted hyper-link phrase. While this tool is useful it requires the system user to input the hyperlink address without error, a daunting task in many cases, especially as Internet addresses become longer and longer. In addition, inserting an address into record text tends to break up a readers train of thought.

Other tools have been developed which allow a user to earmark text phrases within a record for linking to web browser pages and then to manually provide a linking address for each earmarked phrase. These tools render more readable records but still require a user to enter complete Internet addresses which is a tedious task.

In addition to the systems described above the industry has also developed tools that enable a user to publish records as web documents that can be linked to other documents via addresses. Again the addresses have to be specified by the system user during publishing and each time the record is to be linked the system user has to again specify the address.

Efforts have been made to automate the web publishing process. One particularly useful effort is described in pending U.S. patent application Ser. No. 09/247,349 (hereinafter "the '349 application") which was filed by the present inventor on Feb. 10, 1999, is entitled "Method and System for Automated Data Storage and Retrieval" and is incorporated herein by reference. The '349 application describes a system wherein a processor recognizes keywords, keyword phrases or data references (DRs) in a first record which reference other records stored on one or more databases and then generates links to the referenced records so that a person examining the first record can easily access any of the referenced records. Preferably access to the referenced records is facilitated by visually displaying the keyword phrase or DR in a highlighted format (e.g., similar to a hypertext linking phrase) which is selectable by a system user via a mouse controlled cursor or the like. Upon selection of the phrase or DR, the associated record is provided.

U.S. Pat. No. 5,895,461 which issued on Apr. 20, 1999, is entitled "Method and System for Automated Data Storage and Retrieval with Uniform Addressing Scheme", is a parent patent to the '349 application and which is also incorporated herein by reference teaches a system whereby a system user can indicate a keyword phrase (e.g., via entry of a special character earmarking the phrase) within a first record which is meant to reference another record. When the keyword phrase is identified, a processor uses the phrase to determine which record the phrase should be linked to and then renders the referenced record accessible within the first record.

Again, in one preferred embodiment, the referenced record is rendered accessible by visually highlighting the keyword phrase in the first record in a format that is selectable to access the referenced record. This patent also teaches a system whereby a user can enter a phrase into a special search request field and, thereafter, the processor will locate a specific record stored on a database linked thereto that is referenced by the request. This patent contemplates that any database, including databases linked to a processor via the Internet, may be searched for a record referenced in another record.

While the above described searching and linking systems have many advantages, they still suffer from several important shortcomings. First, in many cases a system user does not know exactly on which of several different databases a record is stored. For example, with respect to a LAN or WAN, often there are many different databases which a specific system user may use to store a record. Subsequent to storing a record the user may not remember which of several different databases to search to locate the record. In this case the search process entails searching each database separately, often a time consuming process.

Second, in many cases the tools provided to search one database may be completely different than the tools provided to search another database. For example, to search a memory that is directly linked to a computer a document manager may be employed while to search an Internet database a search engine may be employed. Thus, a complete search in this case would require a system user to use many different tools in order to locate a specific record.

Third, vintage database systems typically either require a system user to specify a database to be searched (e.g., this is true in the case of a LAN or a WAN) or include a managing processor which identifies a single database to be searched when a record query is made as in the case of the Internet. In many cases such simple searching routines fail to search all of the possible records which may be referenced by a query. For example, in the case of a LAN that searches only one database at a time, records stored under other databases would not be contemplated. Similarly and as another example, in the case of the Internet, assuming a search request for a record wherein a primary term in the query is "Illinois", an exemplary search engine typically includes a managing processor which identifies a server and related databases that correspond to Illinois and the search is limited to the identified server and linked databases.

Fourth, the systems described above fail to contemplate that, in a universe of databases, efficient database searching should follow a specific order wherein searching begins in the most likely location in which a specific sought record will be located followed by less likely locations.

Fifth, while systems exist for identifying and accessing records which correspond to randomly selected references in a first record, there is no system as of yet which facilitates inserting quick links between randomly selected references in a first record and second records associated with the selected references.

Sixth, often novice database users fail to recognize that a record may be stored on more than one database. As a result, after a single database has been searched to locate a record, often a novice user will assume the record has been lost or is inaccessible for some other reason. In this case the user would likely attempt to either recreate the lost record or access the record in some other form (e.g., hard copy stored in a traditional filing cabinet) despite the fact that, by simply specifying another database for searching, the record may be easily located.

Thus, it would be advantageous to have a system and method that overcomes the limitations described above. Specifically, it would be advantageous to have a system that automatically facilitates efficient database searching, that limits or extends database searches as a function of characteristics (e.g., reference content, reference context, the processor used to indicate the reference, etc.) of a reference to the record sought and that enables easy linking between a located record and a reference in another record.

BRIEF SUMMARY OF THE INVENTION

In its simplest form, the inventive method includes receiving a record query or data reference (DR) from a system user via some network interfacing device, examining the DR to identify DR content or non-content characteristics or both content and non-content characteristics associated with the DR, based on the identified information selecting a sub-set of databases/directories to be searched for a record referenced by the DR, ordering the databases/directories as a function of likelihood that a referenced record will be located therein and then performing a search.

Thus, it has been recognized that DRs can be characterized by both content and non-content characteristics which can be used to select database/directory sub-sets which are relatively most likely to include records referenced by the DRs. This simple realization enables an extremely simple front end interface as a system user no longer has to worry about which database or directory includes a sought record. Like an Internet portal, a processor determines which databases to search for a sought record. However, unlike an Internet browser that only searches a single tier of databases (e.g., only searches Internet linked databases), the present invention searches multiple database tiers when appropriate. For example, given a network system including a plurality of workstations linked to a local LAN, local servers, local databases, a WAN, remote LANs (including remote LAN servers and databases) and Internet servers and databases, when a DR is provided, a processor may elect to search any of the linked databases in any order. For instance, given the above configured system, the processor search order may proceed according to the following order: a first workstation hard drive, a first local LAN database, a first Internet linked database, a second workstation hard drive, a third workstation hard drive, a WAN linked database, etc., the order selected so as to render extremely efficient and accurate search results.

After searching a first database/directory set, if a DR referenced record is identified, in one embodiment the processor renders the record accessible. If no DR referenced records are identified the processor performs of several different preferred sub-functions. Which sub-function is performed being a matter of designer choice although some sub-functions are preferred for specific applications as described hereinafter. For instance, in one embodiment, the sub-function is to indicate that no records referenced by the DR were found.

In another embodiment the sub-function is to indicate that no records were found but to facilitate the option to search a second database/directory sub-set. The second sub-set may be identified by the processor prior to providing the additional searching option or after the option is selected.

The sub-sets to be searched may be identified in any manner. For example, in a preferred embodiment the sub-set and the order of searching may have a one-to-one relationship to the combination of content and non-content characteristics associated with a DR. Similarly, the sub-function may also have a one-to-one relationship to the combination of content and non-content characteristic associated with a DR. In this case, after DR content and non-content characteristics are identified a simple look-up table can be used to identify the sub-set and order (i.e., sub-set/order) of databases/directories to be searched and, if a DR referenced record is not located, then the sub-function can be performed.

In another embodiment, depending upon the nature of a DR a processor may be programmed to search for more than one (e.g., N, where N is an integer greater than one) record. For example, on one hand, were a DR is extremely detailed (e.g., My letter to Tom Jones of Dec. 1, 1999), the processor may only search for a single record as the detailed DR likely includes sufficient information to differentiate one record from all other records. On the other hand, where a DR is relatively general (e.g., "my letter"), the processor may be programmed to recognize the generality and search for a plurality (e.g., N) of records which fit the description, leaving a final discriminating selection to the querying system user.

In one embodiment the sub-function is dependent upon the results of searching a database/directory sub-set. For example, where N records are sought and no DR referenced records are located, the processor may be programmed to search a second database/directory sub-set while, if at least one DR referenced record is located, the processor may be programmed to halt the search and render the located records accessible. This feature is handy where there is a relatively large drop off between first and second database/directory sub-sets in likelihood that a DR referenced record will be included in the sub-sets. For instance, assume a physician is searching for a report generated at a specific medical facility and related to a specific patient. Also assume that, on the system being searched, virtually all patient reports stored on a specific local LAN database and only very few reports are saved in other WAN linked databases.

Moreover, assume that the physician is only capable of providing a general DR so that the processor will search for N (i.e., more than one) records. Clearly in this case there is a much greater likelihood that a report generated at the specific medical facility will be located on the local LAN database than on other network linked databases. Under these circumstances even if a first record is located on the local LAN database and four additional records are located on WAN linked databases which reference the patient, there is a much greater likelihood that the locally stored record is the record sought and hence the search should be halted after the local LAN database is searched if at least one DR referenced record is identified.

In one other embodiment, when a list of DR referenced records is provided for a system user to choose from, the processor may be equipped to generate a link for future purposes between the DR and one of the list records selected by a system user. For example, assume a relatively general DR is provided by a system user in a DR box or field via a workstation display and that, because the DR is relatively general, the processor returns a list of 10 (e.g., N=10) DR referenced records. In this case, when the list is displayed for user selection and the user selects one of the 10 records, the processor may be programmed to remember the association between the DR and the selected record so that the next time the same DR is provided to the processor, the processor will recognize the DR and automatically render the previously located record accessible. In the alternative, when one of the ten records is selected the processor may render the selected record accessible and provide a link forming icon which, when selected, forms a link between the record selected and the DR for future use. This feature allows the user to browse the selected record prior to linking.

Each of the sub-sets, sub-functions and other searching and linking features described above are a matter of system administrator choice and should be selected using logic calculated to result in efficient searching. For example, as described above, where a DR is relatively detailed so that DR content and non-content characteristics likely will distinguish one record from all other records, the number of records sought should be small and preferably one and where a DR is relatively general the number (N) of records sought should be relatively large. In addition, the administrator will preferably apply knowledge about a network system to earmark database sub-sets for searching which will efficiently yield high quality search results. For instance, knowing that essentially all of a specific physician's letters are stored either on the physician's personal workstation hard drive or on a specific local LAN database, hard drive and the specific local LAN database as a first database sub-set to be searched when a DR references one of the physician's letters. Similar simple rules based on an administrator's familiarity with a network are also contemplated.

In another embodiment a system may include more than one record searching processor and, depending upon characteristic qualifiers there may be better processors to manage the searching function than other processors. For example, a first search processor may be located in a medical facility and may be programmed to identify CQs useful in categorizing records in a medical facility while a second search processor is located in the City of Minneapolis and is programmed to identify CQs useful in categorizing records related to the City of Minneapolis. In this case it is contemplated that, when a DR related to Minneapolis is provided to the inventive system, the first processor would recognize that some other processor would be more suitable to manage record searching. The first processor would send the DR and, perhaps additional information, to a search processor server programmed to identify the most suitable second search processor for performing the Minneapolis record search. Which information is sent to the search processor server and which of the first and second servers performs steps such as identifying CQs, identifying database sub-sets, etc. is irrelevant. The important point here is that more than one search processor can cooperate together to achieve the ultimate goal of performing efficient database searching.

These and other aspects of the invention will become apparent from the following description. In the description, reference is made to the accompanying drawings which form a part hereof, and in which there is shown a preferred embodiment of the invention. Such embodiment does not necessarily represent the full scope of the invention and reference is made therefor, to the claims herein for interpreting the scope of the invention.

BRIEF DESCRIPTION OF THE SEVERAL VIEWS OF THE DRAWINGS

FIG. 2 is a schematic representation of the search processor of FIG. 1, a characteristic qualifier table according to the present invention;

FIG. 3 is a schematic representation of a CQ Table according to the present invention;

DETAILED DESCRIPTION OF THE INVETION

Figure 1:
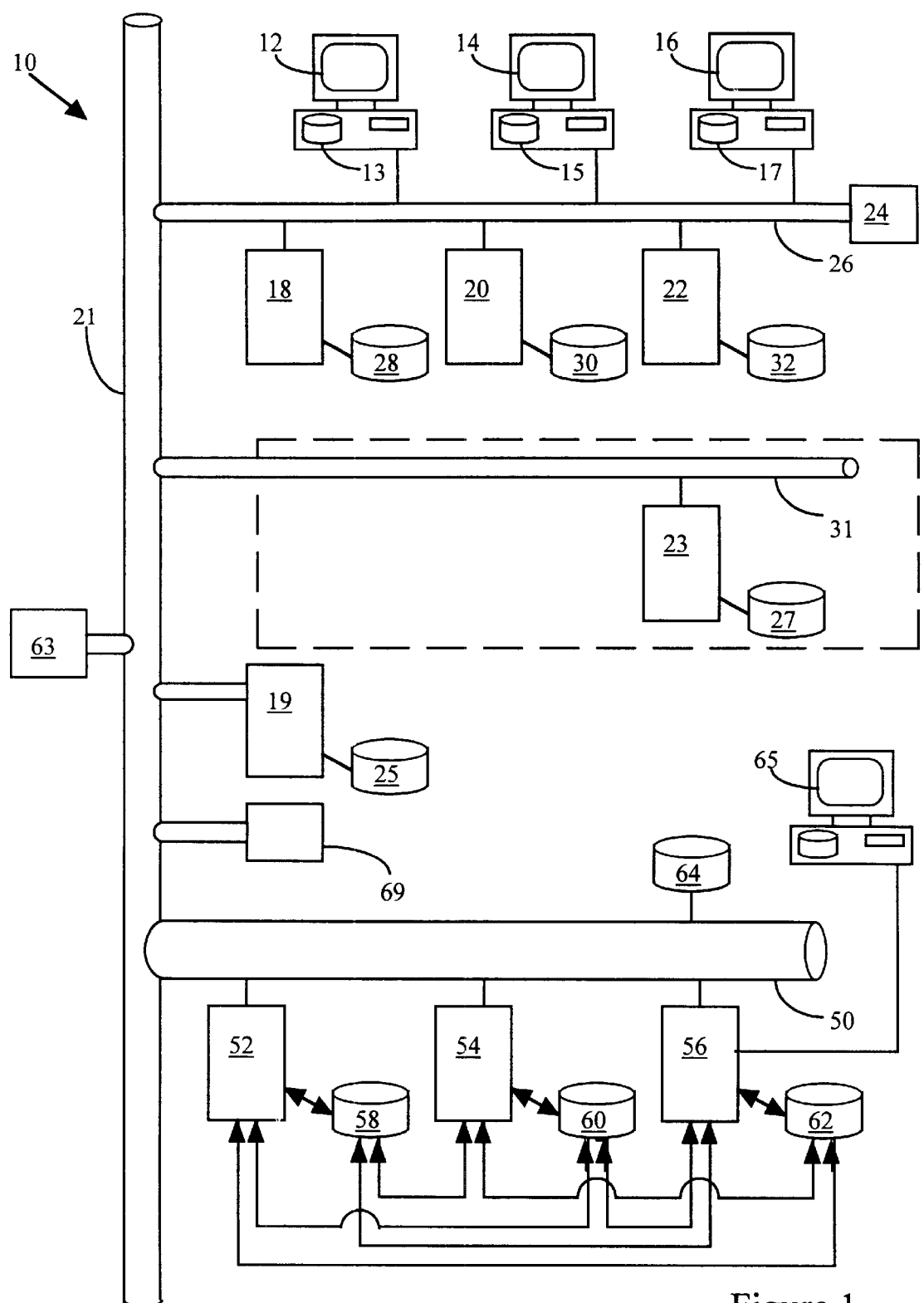
FIG. 1 is a schematic of an exemplary network system including a search processor according to the present invention.

Referring now to the drawings wherein like reference numerals correspond to like components throughout the several views and, more specifically, referring to FIG. 1, the present invention will be described in the context of a system including linked workstations, servers and databases. The exemplary system 10 includes three workstations 12, 14 and 16, three local servers 18, 20 and 22 and a first search processor 24, all of which are linked by a local area network LAN 26. Each of local servers 18, 20 and 22 is linked to a separate set of databases 28, 30 and 32, respectively and is capable of accessing, searching and manipulating records stored in linked databases and sub-sets of those databases.

In the present example it will be assumed that LAN 26 serves (i.e., links together system components at) a single medical facility (hereinafter the "local facility") and system users will generically be referred to as physicians. Any query provided by a system user will be referred to as a data reference (DR) unless indicated otherwise.

Each workstation 12, 14 and 16 is typically a personal computer although other types of interfacing front end network linking devices may be employed (e.g. personal digital assistance, cellular telephones, etc.). In addition to including a separate processor (not illustrated), each workstation 12, 14 and 16 also includes a device unique data storage component, typically a hard drive 13, 15, 17 respectively, on which various records may be stored.

As is typical in many work environments, often only a single system user will use a specific workstation or, in the alternative, only a small number of users will use a specific workstation. For the purposes of the present explanation it will be assumed that workstation 12 is a personal computer owned and solely used by a Dr. Mendell, workstation 14 is a "community workstation" accessible routinely by eight physicians including Dr. Mendell that work in one wing of the local facility and workstation 16 is a workstation in an ECG center at the local facility.

LAN 26 is linked to a wide area network (WAN) 21. In this explanation WAN 21 serves to link local facility LAN 26 to other affiliated facility networks such as remote LAN 31 and to WAN specific servers such as server 19 and database sets such as set 25. In addition, WAN 21 links LAN 26 to a second search processor 63 and to a search processor server 69. Remote LAN 31 is located at another medical facility. Hereinafter, facilities linked to local LAN 26 via WAN 21 are generically referred to as "affiliated facilities". LAN 31 includes at least one server 23 and at least one database set 27. Each of servers 19 and 23 is capable of searching, accessing and otherwise manipulating records stored in linked database sets 25 and 27, respectively. Although illustrated as being directly linked to LAN 26, many systems link WANs and LANs via the Internet.

WAN 21 is linked to the Internet which is collectively referred to by numeral 50. While Internet 50 includes a huge number of servers and databases, Internet 50 is represented in a simplified form including remote servers 52, 54 and 56 and linked database sets 58, 60, 62, 64, etc. A "visited facility" workstation 65 is linked to server 56. Operation of servers and LAN, WAN and Internet routing hardware is well known in the networking arts and therefore will not be explained here in detail.

Throughout this specification it will be assumed that system 10 is configured such that records having similar characteristics (e.g., that are of similar types, authored by the same system user, that are authored on the same date, etc.) are typically stored at similar network locations (e.g., on the same database and within a specific directory). Nevertheless, it will also be assumed that while records having specific characteristics are typically stored in the same database/directory, in many cases records having the same characteristics may also be stored in more than one network location.

For instance, in the present example Dr. Mendell's personal letters would most likely be stored on hard drive 13 associated with Dr. Mendell's personal workstation 12 while some of Dr. Mendell's personal letters may be stored on any of the local databases (e.g., 28, 30, 32). It would be highly unlikely that Dr. Mendell's letters would be stored on more remote databases such as WAN linked database sets 25 and 27 or Internet linked databases (e.g., 58, 60, etc.).

As another instance, assuming a directory on database set 32 has been earmarked for storing all ECG reports generated at the local facility, typically all ECG reports would be stored within that directory. Nevertheless, ECG reports for other patients treated at affiliated facilities may be stored on one of the remote databases (e.g., a database in set 27). In addition, the affiliated facilities may also rent storage space on any of the remote database sets (e.g., 58, 60, etc.) for ECG report storage.

As one other example, medical procedure brochures may typically be stored on databases linked to WAN 21 so that all physicians at affiliated facilities can easily access the brochures. Despite providing their own brochures for physicians to access there may be additional resources related to medical procedures located on Internet linked databases (e.g., database sets 58, 60, etc.).

As one additional instance, general reports concerning new procedures not yet adopted at the local or affiliated facilities likely would not be stored on LAN or WAN linked databases but would rather be located on Internet linked databases.

In this typical electronic records environment where there are relative likelihoods that records of specific types will be located in specific database directories and on specific databases, which databases and which directories to search for specific records and the order in which to search for specific records is extremely important.

Referring still to FIG. 1 and also to FIG. 2, processor 24 includes both a microprocessor 68 (hereinafter "processor 68") and a memory 70. Processor 68 is equipped to recognize various characteristics of search queries and, based on those characteristics, select the most likely databases and directories to include the record(s) sought via the query. Thereafter, the databases/directories selected are ordered with the most likely database/directory to include a relevant record first followed by databases/directories which are relatively less likely to include relevant records. After ordering is complete processor 68 searches the selected and ordered databases/directories for relevant records.

In addition, it is contemplated that processor 68 may also be programmed to be able to recognize that some other web linked processor or server may be better equipped to determine which databases and directories will include records sought via a query. In effect, instead of identifying a database to be searched, processor 68 identifies another server to perform a search. In this case, it is contemplated that processor 68 is programmed to aid or cooperate with the other processor/server to gather information about the record sought which can then be used to select databases to be searched and then search the databases for relevant records. Hereinafter such an exemplary "other" web linked server or processor will be referred too generally as a second search processor. Referring still to FIG. 1, an exemplary second search processor is identified by numeral 63. Referring also to FIG. 2, second processor 63 will generally have the same architecture as search processor 24. Although only a single second search processor 63 is illustrated it is contemplated that many (e.g., hundreds) second processors may be linked to system 10.

In one embodiment, when processor 68 recognizes that second processor 63 should perform a search, processor 68 assembles a query including all identifiable information related to a DR and sends the query to second processor 63. In this case second processor 63, like processor 68 above, selects the most likely databases to include relevant records, orders the records according to likelihood of including relevant records and then searches the databases via the order. The query may include any set of DR related information including just the DR, a DR and some other DR characteristic qualifiers, a DR and a complete record including the DR, a DR and additional information correlated with the DR as described below, the correlated information from a table or the like, etc.

In another embodiment processor 68 may simple send a DR to second processor 63 and second processor 63 may then identify additional information required to select likely relevant databases. Thereafter, second processor 63 may send a data request back to processor 68 in an attempt to identify additional required information to further qualify the DR for search purposes. Upon receiving the request, processor 68 may examine DR related information to locate information identified in the data request, format located data for transmission and send the formatted data to second processor 63. Second processor 63 then uses the received data along with the DR to identify relevant databases, order the databases and perform a search for relevant records.

Importantly, many databases may be likely to include relevant records independent of where within the hierarchy of system 10 the databases are located. For example, referring again to FIG. 1, consistent with the example above, assuming ECG reports for the local facility may be stored on a database within set 32 or on one of remote database sets 25, 27, 58, 60, 62 or 64, each of the likely databases will be searched starting with the local database set 32 followed by the remote WAN databases and the Internet databases until relevant records are located. Where a database includes one or more directories that indicate records stored on the database, searching preferably entails examining the directories to identify sought records. However, where a database does not include a directory searching entails examining each database record to identify the sought record.

Various rules are contemplated including halting a search when a first record is located or continuing a search until N (e.g., 1, 3, 5. etc.) records are located or until a set of databases likely to include relevant records has been searched. Any manner of selecting a database/directory sub-set for searching for relevant records may be used including a sub-set look-up table as described in more detail below, a thresholding process wherein relative likelihoods of including relevant records is determined and only databases having relatively high likelihoods are searched, etc.

Other rules may provide a physician with the option to search other databases that are relatively less likely than the first set of databases to include relevant records but which have likelihoods of including relevant records that are still relatively high. The rules governing these options are typically provided as part of a sub-function as indicated above and as described in more detail hereinafter.

Referring still to FIGS. 1 and 2, search processor 68 is linked to LAN 26 via bus 72. Processor 68 receives information from workstations 12, 14 and 16 and, based on the information received, manages database searching. To manage database searching, memory 70 includes a characteristic qualifier (CQ) table 74 and a Searching Rules Table 76. Tables 74 and 76 are illustrated in more detail in FIGS. 3 and 4, respectively.

Referring to FIGS. 2 and 3, exemplary CQ table 74 includes two separate lists of CQs, a first list 82 including content characteristic qualifiers CCQ-1 through CCQ-P and a second list 84 including non-content characteristic qualifiers NCQ-1 through NCQ-Q. On the one hand, as the name implies, a CCQ is a characteristic of a DR that is derived directly from DR content (i.e., is derived from the text that constitutes the DR). On the other hand, as the name implies, a non-content characteristic qualifier (e.g., NCQ-1) is a characteristic that is associated with a DR that is not derived from the DR itself but which indicates the nature of the record sought. To this end NCQs include both visible and non-visible record content that is not derived from a DR itself, record description information, system user information, querying device (e.g., workstation) information, other information that can be correlated with a DR from other sources, etc. While several CCQ and NCQ examples are provided hereinafter, the invention should not be limited by the examples here as other CQs are contemplated.

Referring still to FIG. 3 examples of CCQs and NCQs are provided. For instance, CCQ-1 corresponds to the term "letter". In this case, referring also to FIG. 2, when processor 68 receives a DR which includes the word "letter", processor 68 recognizes that CCQ-1 has been satisfied. Another exemplary CCQ is CCQ-2 that is a date qualifier. Thus, when a date is provided in a DR, processor 68 recognizes the qualifier as a date and recognizes that CCQ-2 is satisfied.

Pending U.S. patent application Ser. No. 09/374,568 (hereinafter "the '568 application) which is entitled "Method for Database Address Specification" which was filed on Aug. 13, 1999 by the present inventor and which is incorporated herein by reference teaches a system which automatically recognizes date qualifiers in any format and converts the qualifiers to a format required by a specific processor. A similar system is contemplated here for recognizing date qualifiers which may take any of several different forms in a DR and for recognizing other variable form qualifiers (e.g., time, physician names, report references, patient references, procedure or medication references, etc.).

Referring still to FIG. 3, another CCQ is the phrase "ECG report" which corresponds to CCQ-3. When processor 68 receives a DR including the phrase "ECG report" or some other recognizable variable form of that qualifier, processor 68 identifies that CCQ-3 has been satisfied. As illustrated in FIG. 3, CCQ-4 corresponds to the term "doctor" and CCQ-5 corresponds to a patient ID#. Referring still to FIG. 3, CCQ-P refers to a recipient qualifier (e.g., the recipient of a letter, a fax, etc.).

Referring still to FIG. 3, an exemplary non-content characteristic qualifier NCQ-1 corresponds to the identity of a processor used to provide a DR. For example, referring once again to FIG. 1, as indicated above workstation 14 is a community workstation (i.e., is used by several physicians located in a specific local facility wing). Because workstation 14 is affiliated with the local facility, records associated therewith likely will be stored either on hard drive 15 or on local databases (e.g., 28, 30, 32). Similarly, referring to FIG. 1, if a workstation (not illustrated) linked directly to server 19 is used to create a record, most likely the record will be stored on one of databases 25. In this case, likely location of a record sought is often tied to which workstation is used to provide a DR referencing a record. While important for determining which set of databases to search for a record sought using workstation 14, workstation identity is not related to the content of the DR and hence the nomenclature "non-content CQ".

Exemplary non-content characteristic qualifier NCQ-2 corresponds to a workstation user's identity. For instance, assume a physician routinely stores all of his records on a specific directory of local database set 28. Clearly, given no other information about a DR, when the physician provides the DR to access a record, the set 28 directory typically used by the physician should be searched for the record sought. Once again, while important for efficient searching, the physician's identity is not DR content related.

Exemplary NCQ-3 corresponds to record "description information" that can be used to qualify DR's. For example, systems already exist wherein a DR may be selected from within a record including other data wherein description information corresponding to the record including the DR is used to further characterize the DR for searching purposes. For instance, U.S. patent application '349 (referenced first above) teaches a system whereby a processor is capable of recognizing DRs in a first record which reference other records. When a DR is identified, the processor also searches for descriptive information about the record in which the DR is present to identify other information that can be used along with the DR to form an address to the record referenced by the DR. One type of descriptive information that may be identified by the processor is the creation date of the record that includes the DR. Such a record creation date is one example of record description information contemplated by NCQ-3. Creation date is important because, for example, it may be presumed that any DR referenced record likely would exist prior to the reference being used (although this is not always the case).

Although not illustrated in FIG. 3, another important NCQ (e.g., NCQ-Q) includes record information which, although hidden to a system user, can be identified by processor 68 (see also FIG. 2). The most familiar record information fitting this description includes markup language notations including hypertext markup language (HTML) and extensible markup languages (XML). The XML protocol enables document generators to include "XML tags" within records that earmark record segments as corresponding to specific information types. While the tags are recognizable by a processor (e.g., processor 68) the tags are invisible to a system user viewing the record. For example, when viewing an ECG report via a workstation display, the report may include a diagnosis section. To enable a processor to identify the diagnosis section, processor recognizable "begin diagnosis" and "end diagnosis" tags are placed within the record before and after the diagnosis portion of the record. The tags can be used to further qualify any DR that appears within the record segment between the tags.

Figure 8:
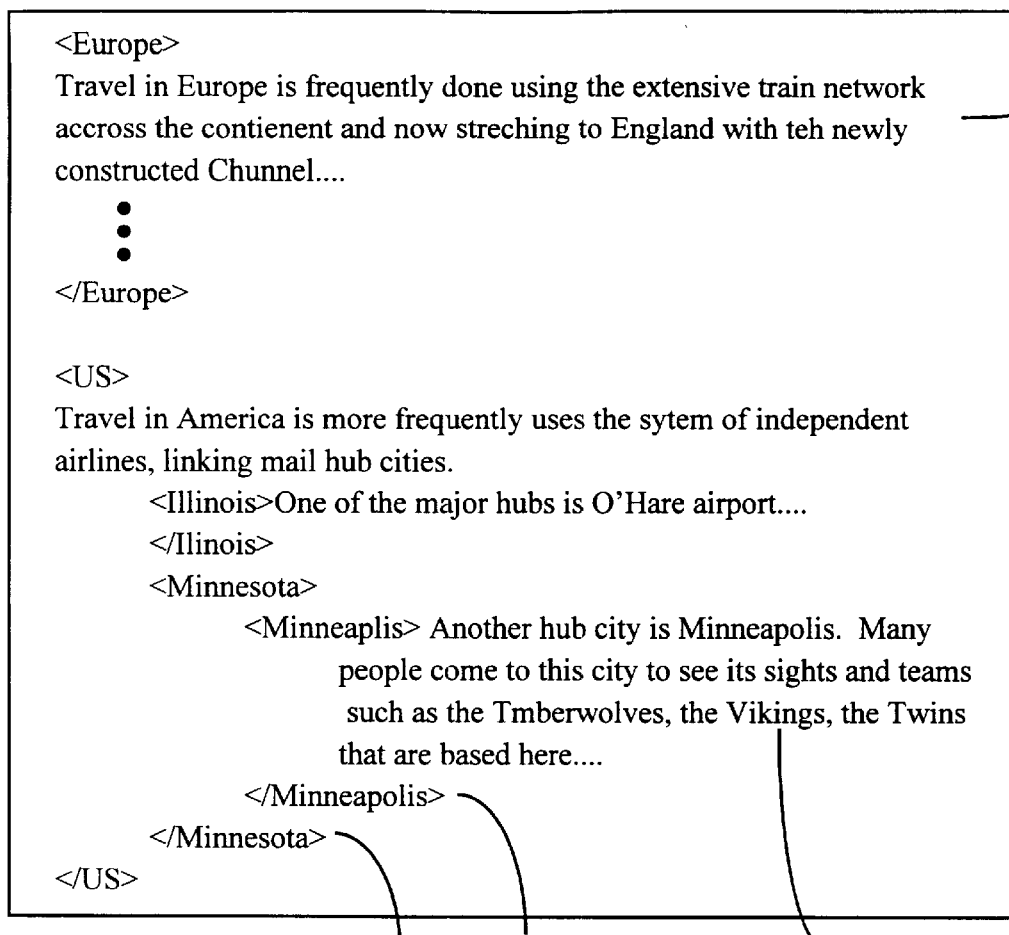
FIG. 8 is an exemplary XML tagged record.

Referring to FIG. 8, an exemplary XML "tagged" document is illustrated that is purposefully not related to the medical industry so as to highlight the versatility of the present invention. Document 300 is a document that relates to the travel industry and includes information concerning, among other destinations, Europe and the United States. Various tag pairs (e.g., start and end tags) are interspersed within document 300 that separate information therebetween into destination specific information. In other words the tag pairs indicate characteristics about the information therebetween. Start tags are identified by an indication "< . . . >" while end tags are identified by an indication "</ . . . >" where " . . . " indicates a characteristic about information related thereto. For instance, the "<Europe>" tag indicates a start tag corresponding to information related to Europe while the "</Europe>" tag indicates the end of information related to Europe. Thus, all information between tags <Europe> and </Europe> relates to Europe. Similarly, all information between tags <US> and </US> relates to the United States.

Within the information related to the United States additional tags are "nested" that further divide destination information. For example, there are start and end tags related to Illinois (i.e., <Illinois> and </Illinois>) and relating to Minnesota (i.e., <Minnesota> and </Minnesota>) 301, etc. Many other destination tags are contemplated in document 300 that are not shown in the interest of simplifying this explanation.

Information within Minnesota tagged section 301 is also further tagged. Specifically, information related to Minneapolis is tagged with start and end tags <Minneapolis> and </Minneapolis>, respectively. Other and additional nested information tagging is contemplated. As illustrated, a sentence fragment 302 within the Minneapolis tagged section reads "and teams such as the Timberwolves, the Vikings, the Twins . . . " describing some of the sports teams that play in the Minneapolis area.

Although hidden from a document reader, each nested XML tag pair (i.e., a start and an end tag) illustrated in FIG. 8 can be used by a computer to further define information therebetween. For example, if a person examining document 300 used a mouse controlled cursor to select the term "Vikings" 304, processor 68 can examine document 300 and identify all XML tags related thereto such as the Minneapolis pair, the Minnesota pair and the US pair to determine that the user likely is searching for information related to the Vikings sports franchise in Minneapolis Minnesota in the United States as opposed to Vikings from Europe. Thus, XML and other markup language tags are one useful form of NCQ.

In addition, referring still to FIGS. 2 and 8, in the same example processor 68 may also be programmed to, when a phrase is selected, identify the sentence, the paragraph, a sentence fragment, an XML tagged section or some other document section to be searched for additional NCQ information. For instance, when the term "Vikings" 304 is selected, processor 68 may be programmed to search the Minneapolis tagged document section to search for additional NCQs. Which document section is to be searched upon selection of a term or phrase within the document is a matter of designer choice.

Another general NCQ category includes NCQs referred to generally as "correlated NCQs". A correlated NCQ is a characteristic that, although not included in a record or provided by a system user upon issuing a query, can be correlated by a searching processor with a DR to further qualify the DR. For example, referring again to FIG. 1, assume Dr. Mendell from the "home" facility (i.e., the facility at which the physician typically works) linked to LAN 26 uses a workstation 65 at a "visited" facility (i.e., a facility at which the physician typically does not work) to search for an ECG report. Also assume that essentially all of the Dr. Mendell's ECG reports are stored on a database 28 linked to home facility server 18.

Figure 9:
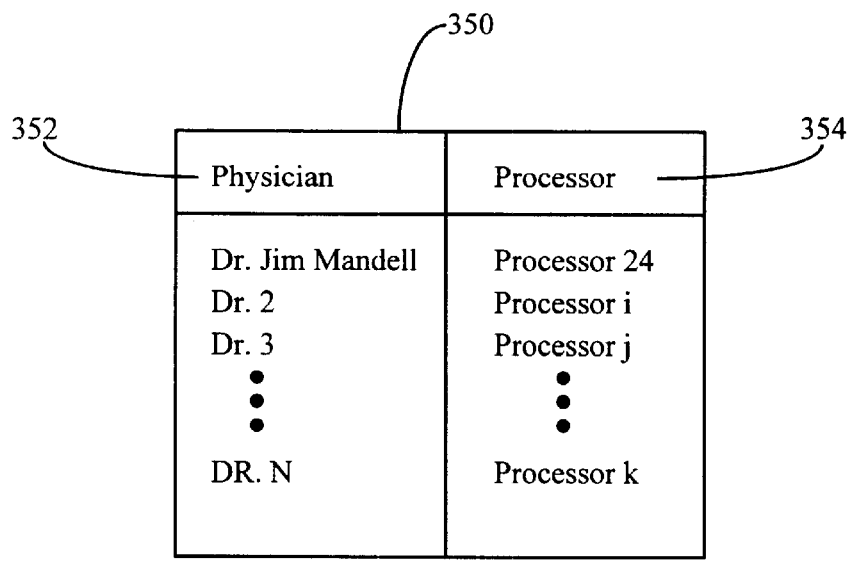
FIG. 9 is an exemplary correlation table that correlates doctor identification and primary processors.

In addition, assume that a visiting physician's database 64 accessible to a server 56 at the visited facility stores correlated physician/home facility information. Referring to FIG. 9, an exemplary database 350 storing correlated physician/home facility information is illustrated. Database 350 includes two columns of information including a physician column 352 and a home facility search processor column 354. Physician column 352 lists visiting physicians while processor column 354 lists a single home facility search processor for each physician in column 352. It is contemplated that database 350 would be routinely updated as additional physician's visit the visited facility. Dr. Mendell is listed in column 352 and is correlated with the St. Mary's search processor (i.e., processor 24 in FIG. 1).

In this case, when Dr. Mendell logs onto workstation 65 at the visited facility, the server 56 at the visited facility identifies Dr. Mendell, accesses the visiting physician database 350 and identifies Dr. Mendell's home facility search processor (i.e., St. Mary's processor 24) which is correlated with the logged on physician (hence the term "correlated NCQ"). Then, when Dr. Mendell enters a query such as "ECG report for George Thomas", server 56 recognizes the DR in the query and any CQs. In addition, server 56 uses Dr. Mendell's home facility search processor identifier to identify the search processor 24 to which to send a search packet for searching. The packet is then sent to Dr. Mendell's home facility search processor and the home search processor then determines which databases/directories, if any, should be searched for the report. Located records are then indicated to Dr. Mendell via the visited facility workstation 65.

Importantly, correlated NCQs facilitate data access from virtually any network interfacing device without requiring a user to specify massive amounts of information about where to find sought records. In effect system servers take on the tasks of identifying information related to DRs that helps to narrow the database world to be searched and all of the narrowing steps are essentially transparent to the querying physician.

It should be recognized that a server that initially receives a search query might, instead of identifying a database set to be searched, identify another server that should perform the step of identifying the database set to be searched. In some of the above example, a first search processor (e.g., 68 in FIG. 2) to receive a DR may have direct access to databases having only very little information related to a DR and therefore any database selection by a search processor may be essentially meaningless (or at least relatively less meaningful than a similar task performed by another web linked processor). By sending the query to some other web linked processor a better-suited database set may be identified for searching purposes.

One other NCQ type may be provided by an interface device to specify a preferred server or processor for performing search management tasks. For example, referring again to FIG. 1, assume again workstation 12 is Dr. Mendell's personal workstation and therefore most of Dr. Mendell's records will be stored proximate processor 24 (i.e., the processor which includes processor 68, see also FIG. 2). Also assume Dr. Mendell owns a hand held network interface device (HHD) (not illustrated) that is used to access system 10 via remote server 19. In this case the HHD may be programmed to, when a query is specified, identify Dr. Mendell and also identify search processor 24 as the preferred processor to perform search management tasks. Thus, the query would be transmitted to processor 24 that would then perform the search as herein described. In this case Dr. Mendell would neither have to log onto the system nor identify the preferred processor and yet a targeted search of databases likely to include relevant records would be performed.

Other NCQs may include a patient identification indicator that identifies a particular patient for which a record is generated, a specific medical facility at which a procedure was performed, the physician that performed a specific procedure, etc. Examples of other NCQs are provided in the '568 application referenced above.

U.S. patent application '349 also teaches that, in addition to record description information, record content associated with a DR which is included in the record can be used to form an address for another record referenced by the DR. For example, where the term "Clinton" appears in a record paragraph and is recognized as a DR which can be linked to another record (e.g., hyperlinked), the content of the paragraph can be used to qualify the term "Clinton" and form a link to an appropriate record. For instance, the term "Clinton" alone may have several appropriate links such as a first link to a record corresponding to President Clinton, a second link to a record corresponding to Hillary Clinton, a third link corresponding to Clinton, Illinois, etc.

Where the paragraph including the term "Clinton" includes a reference to "Hillary", the term "Hillary" can be used to modify the term "Clinton" and therefore to either form an address as specified in the aforementioned specification or to modify a search query as specified in the present application. In this regard, a general NCQ category includes "visible" (as opposed to invisible markup tags) record content that is not included in a DR. To recognize visible information within a record that can be used to modify a DR various methods/processes can be used, one preferred process being one of the well known natural language process algorithms.

Figure 4:
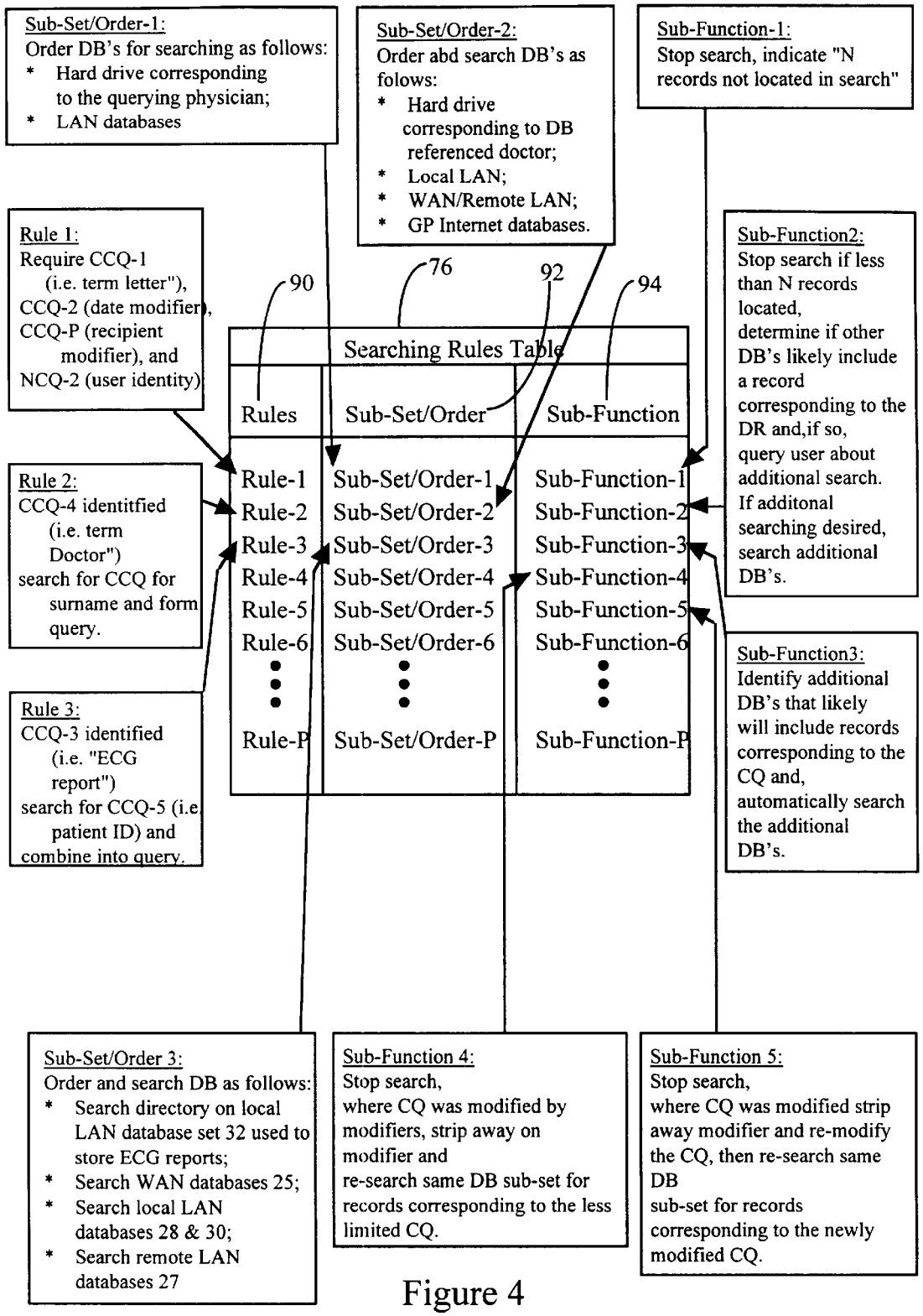
FIG. 4 is a schematic illustrating an exemplary CQ combining/searching rules table according to the present invention.

Referring now to FIGS. 2 and 4, an exemplary Searching Rules Table 76 is illustrated. Table 76 includes a rules column 90, a sub-set/order column 92 and a sub-function column 94.

Rules column 90 includes a plurality of rules identified generally as Rule-1 through Rule-P. While only a small number of rules have been identified and will be discussed here, it is contemplated that many rules will be provided for an operable system and that many of the rules will be much more complex than the rules discussed here.

Each of rules Rule-1 through Rule-P provides some CQ requirement that must be met in order for the rule to be satisfied. For example, a simple rule may be that whenever a DR includes CCQ-1 (i.e., the term "letter" is located in a received DR), the rule is satisfied. A more complex rule may be that when a DR includes CCQ-1 (i.e., the term "letter") and CCQ-P (i.e., a recipient qualifier) and wherein NCQ-2 is satisfied (i.e., identity of physician making request can be determined from the physician's system log on name), the rule is satisfied.

In addition to specifying a CQ requirement, it is contemplated that some rules will include secondary CQ requirements that are examined only after primary CQ requirements are satisfied. For example, one rule may specify that if CCQ-1 (i.e., the term "letter") is satisfied by a DR, a secondary requirement for the rule to be satisfied is that other CQs be present. For instance, in this example, a secondary CQ may be a recipient modifier, a date modifier, a specifying physician modifier, etc., or any combination of additional modifying CQs. Other exemplary rules are described in more detail below.

Moreover, although not specified, each rule in column 90 also specifies a search query format that indicates how CQs corresponding to a DR should be arranged to facilitate a search. In other words a processor to map the CQs into a query format required by the servers that will perform the searches uses the rule. For instance, if a DR specifies an ECG report for a specific patient, the query format may require the phrase "ECG report" and the patient ID number to be arranged as "######### ECG report" where "#########" is the patient ID number.

Furthermore, it is contemplated that at least some of the column 90 rules may include a searching limit (i.e., N where N is an integer) which governs the maximum number of records to be sought during a search. To this end, on one hand, while it is desirable that each search return only the single record sought by a querying physician, often the physician will not have enough information to construct a query that can distinguish one record from all others. On the other hand, in some cases sufficient information will be included in a DR and related information (i.e., CQs) for a processor to clearly identify a single record.

For instance, where a physician can specify a letter, the letter recipient, the date the letter was created and the letter author, assuming only one letter to the recipient from the author was created on the specified date, the information should be sufficient for search processor 24 to locate the sought letter. In this case the searching limit may be "1" meaning that after a single letter which fits the DR description is identified, the search should be halted and the record rendered accessible to the querying physician.

On the other hand, when a querying physician only knows the recipient of a letter and the author, that information alone is not sufficient to distinguish between two or more letters from the author to the recipient, which have different dates. In this case the searching limit may be infinite so that all letters from the author to the recipient are rendered accessible. In the alternative, the limit N may be finite and greater than one (e.g. 5, 10, etc.) so that several letters that may be sought are rendered accessible.

Furthermore, at least some of the rules may specify that during a search, if N records are identified which are referenced by the DR, the search should be halted and all of the N records should be rendered accessible (e.g., displayed on a workstation screen in list or icon format).

Referring again to FIG. 8, another rule may be that when a phrase or term (e.g., "Vikings" 304) is selected from within record text, the processor identifies all of the XML tags associated with the selected term and a document section (e.g., a sentence, a paragraph, a section of text within an XML pair common to the selected phrase, etc.) to be combined with the DR for searching purposes.

In some cases when a DR is provided and after corresponding CQs are identified, processor 68 will not be able to identify a specific rule in column 90 that is satisfied by the CQ combination. For instance, in the above referenced example illustrated in FIG. 8, it is likely that if the term "Vikings" 304 is selected from record 300, a medical facility based search processor 24 (see FIG. 1) will not include a rule in column 90 corresponding to the DR and associated CQs (e.g., related XML tags). Thus, without a rule, processor 24 cannot identify a database sub-set for searching and order the sub-set. In effect, the CQ combination is "unsupported" by search processor 24 in the sense that search processor 24 cannot perform the required search.

In the case of an unsupported search query, one default rule may be that when no other rules are satisfied, search processor 24 simply indicate to a querying system user that a search cannot be performed as the search query is not supported by the system.

In the alternative, the invention also contemplates another default rule to handle CQ combinations that are unsupported by specific search processors. To this end, it has been recognized that while a specific search processor may not support a specific CQ combination, another web linked search processor may support the combination. For example, referring again to FIG. 1, second search processor 63 may be a processor associated with the City of Minneapolis Minn. which includes ample information about the Vikings football franchise. It is contemplated that processor 63 would have a similar architecture to processor 24 (see also FIG. 2) and would have its own CQ table and Searching Rules table (see also FIGS. 3 and 4). Thus, after receiving a DR and related CQs corresponding to the term Vikings in FIG. 8, second processor 63 could apply its own rules to the CQ combination to identify a sub-set of databases to search, order the databases and then perform a relevant search.

The manner in which second search processor 63 obtains the CQs may take many different forms. For example, the default rule may be to identify as many CQs in a default CQ set as possible that are related to a DR and provide the default set along with the DR to second processor 63. In the alternative, all of the information related to a DR may be provided to second processor 63 and the second processor 63 then identifies CQs from within the related information. For instance, in the case of a record like record 300 in FIG. 8, the entire record 300 would be sent to second processor 63. Another alternative is to send only the provided DR to second processor 63 and have second processor 63 request CQs from first processor 24 (see FIG. 1). Thereafter first processor 24 identifies all CQs in related to the DR and sends the CQs to second processor 63. Then second processor 63 applies its rules to the CQ combination.

While many different rules are contemplated to handle unsupported CQ combinations, in the interest of simplifying the present explanation it will be assumed that a default rule, Rule-6 in the present case, is to identify as many CQs from a default list of CQs as possible that are related to a provided DR. Then, the CQ combination is sent to search processor server 69. Based on the CQ combination, server 69 identifies a relevant second server (e.g., 63 in FIG. 1) and sends the CQ combination on to the second server. Thereafter the second server applies its searching rules table to the CQ combination to identify a database sub-set to be searched, order the sub-set and perform a search. After the search is completed, second processor 63 returns the search results to the workstation used to render the query.

Thus, for example, referring still to FIGS. 1 and 8, assuming processor 24 does not support a CQ combination corresponding to the term "Vikings" in FIG. 8, Rule-6 specifies identifying all CQs including XML tags and the tagged record sub-section including the term "Vikings" to be sent along with the DR to search processor server 69. In addition, processor 24 also identifies itself to server 69 so that results from a search of remote databases can be sent back to processor 24 for presentation to the system user. Search processor server 69 uses the DR and corresponding CQs to identify second processor 63 as a processor that will likely support the CQ combination and sends the combination thereto for searching.

Referring still to FIG. 4, Sub-set/Order column 92 specifies a separate sub-set/order specification (i.e., Sub-set/order-1 through Sub-set/order-P) for each rule in column 90. While the sub-set/order specifications are described herein as having a one-to-one relationship with rules in column 90 in order to simplify this explanation, the relationships likely would be more complicated than one-to-one correlations.

In one embodiment of the present invention each sub-set/order specification specifies a sub-set of databases/directories to be searched when a corresponding rule has been satisfied. For instance, for the simple rule described above, when the term "letter" is included in a DR and assuming all physician letters are stored in either a first local LAN database or a specific WAN database, the sub-set may include only the first local LAN and specific WAN databases where all letters are stored. In the alternative, the subset/order specification may include both a hard drive linked to a workstation used to provide the DR and the first local LAN and specific WAN databases where all letters should be stored and the order may be the LAN and WAN databases first and the hard drive second. Other more complex sub-set/order specifications are contemplated and described below.

In the case of default Rule-6 where a CQ combination is not supported by search processor 24, instead of specifying a sub-set of databases and an order of those databases to be searched, sub-set/order-6 specifies that the CQ combination should be sent to search processor server 69 for selection of some other search processor (e.g., second processor 63).

In a preferred embodiment, which databases and directories should be included in a sub-set for searching is to be pre-programmed by a system administrator and should use general rules of thumb which would be used if a system user where manually attempting to search for a record on system 10. For instance, in the letter example above, clearly when all letters are stored on specific known databases, those databases would be included in the sub-set to be searched while more remote databases (e.g., Internet linked databases) would not be included in the sub-set. Thus, common sense rules are encoded in the sub-set/order specifications.

Sub-Function column 94 includes a separate sub-function corresponding to each rule in column 90. Each sub-function specifies a process to be performed after the directories and databases specified in a corresponding sub-set/order specification have been searched. For instance, assume all directories and databases specified by a sub-set/order have been searched and N records where not located which are related to a specified DR. In this case an exemplary sub-function may be to simply indicate to a user physician that less than N records corresponding to the DR were located and to render the located records accessible.

Another exemplary sub-function may be to identify additional databases which, although not as likely as the databases identified in the subset/order to include relevant records, are still relatively likely to include relevant records and then either provide the user the option to search the additional databases or automatically search the additional databases while notifying the user that a second tier of databases is being searched. Other sub-functions are contemplated and several examples are discussed in detail below. As with the sub-set/order specifications, the sub-function specifications are programmed by a system administrator and reflect decisions made by the administrator as to whether or not additional searching should be performed and if so, which other databases should be searched.

Referring still to FIGS. 3 and 4, Rule-1 requires CCQ-1 (i.e., term "letter"), CCQ-2 (i.e., a date modifier), CCQ-P (i.e., a recipient modifier) and NCQ-2 (i.e., a system user's identity). Thus, Rule-1 is satisfied only if each of those CQs are identified by processor 68 (see also FIG. 2).

Sub-Set/Order-1 corresponds to Rule-1 and specifies that if Rule-1 is satisfied, (i.e., CCQ-1, CCQ-2, CCQ-P and NCQ-1 are satisfied) then the databases (see also FIG. 1) should be ordered and searched as follows. First, the hard drive corresponding to the querying physician should be searched. Thus, for example, in the case of Dr. Mendell (see example above), because drive 15 corresponding to workstation 12 is Dr. Mendell's personal computer, if Dr. Mendell provided the DR, independent of which workstation was used to provide the DR, hard drive 13 should be searched first. Second, if the letter sought is not located on drive 13, sub-set/order-1 specifies that LAN databases 28, 30 and 32 should be searched.

Referring still to FIG. 4, sub-function-1 specifies that, after the databases identified in sub-set/order-1 have been searched, if X records corresponding to the DR were located and X is less than N, processor 68 should stop searching and indicate that "X records were located in the search." In the case of a letter, the likelihood of a physician's letter being stored somewhere other than the physician's workstation hard drive or one of the LAN local servers connected thereto is highly unlikely. For instance, a physician is unlikely to store a letter on a remote server linked via the Internet (although such a storage scheme is possible). In the future, if LAN users begin to store letters and the like on remotely linked servers, Sub-Function-1 corresponding to a letter may be altered to reflect reality.

Referring again to FIG. 4, Rule-2 specifies that if CCQ-4 is identified, processor 68 should search for a CCQ corresponding to a surname of a physician working at the local facility or at an affiliated facility. For instance, assume that only four doctors work at a medical facility and one of the doctors names is Dr. Mendell. In this case, when the term "doctor" is identified in a DR, processor 68 searches for each of the doctor's names including "Mendell" in the vicinity of the term "doctor". To this end a natural language processing algorithm may be used. Where the surname "Mendell" is identified in the vicinity of the term "doctor", processor 68 constructs a query to look for records corresponding to Dr. Mendell.

In this case the record to be linked to the reference "Dr. Mendell" may be a physician's biography. In this example it is contemplated that if a doctor's surname is not located and hence Rule-2 is not satisfied, processor 68 would not perform a search for a record related to Rule-2. Nevertheless, processor 68 may still perform a search pursuant to another rule in column 90 (see FIG. 4).

Sub-Set/Order-2 specifies that if Rule-2 is satisfied (i.e., the term "doctor" is located and a surname is located in the vicinity of the term "doctor"), processor 68 should order and search the databases as follows. First, the workstation hard drive corresponding to the doctor referenced in the DR is searched. For example, if the DR specifies Dr. Mendell, drive 13 is searched first. Second, the local LAN corresponding to the DR referenced physician is searched as that is the next most likely place to find a relevant record. Thus, if Dr. Mendell is specified in the DR databases directly linked to LAN 26 are searched. Third, WAN 21 databases and remote LAN linked databases (e.g., 27 in FIG. 1) are searched as the physician may have stored his biography there. Fourth and finally, if the record sought is not located on the local databases, processor 68 branches out into the Internet and searches geographically proximate Internet linked remote servers and databases. Geographically proximate Internet databases are referred to herein as "GP databases".

Referring to FIG. 4, sub-function-2 specifies that, if less than N records are located after searching hard drive 15, LAN databases 28, 30, 27 and 32, WAN databases 25 and the GP Internet databases, processor 68 determines whether or not other databases will likely include a record corresponding to the DR "Dr. Mendell". If other databases will likely include records corresponding to Dr. Mendell processor 68 queries the user to determine whether or not additional searching should be performed. If the user requests additional searching, processor 68 searches the additional likely databases.

Rule-3 includes primary and secondary requirements. The primary requirement is that the DR received includes the phrase "ECG report" (i.e., CCQ-3 in FIG. 3). If the phrase "ECG report" is included in the DR, the secondary requirement is that the DR also include a patient ID number (i.e., CCQ-5 in FIG. 3). If both CCQ-3 and CCQ-5 are satisfied then Rule-3 is satisfied.

Sub-set/order-3 specifies that when Rule-3 is satisfied, processor 68 will first search the directory of local LAN database set 32 which has been earmarked for storing ECG reports. Second, the WAN databases 25 are searched. Third, the local LAN databases 28 and 30 are searched. Fourth and finally, the remote LAN databases 27 are searched.

Sub-function-3 specifies that after the sub-set of databases identified in sub-set/order-3 are searched and if N records referenced by the DR are not located, processor 68 will identify additional databases that likely include records corresponding to the DR and automatically search the additional databases. In this regard the sub-function may specify that this task be performed in any of several different ways. First, processor 68 may be equipped to determine likelihoods that a record referenced by a specific DR will be included in specific databases and, select databases to search which only have a likelihood of including a relevant record which is higher than a threshold likelihood. Second, although not illustrated, table 76 may specify a second tier of sub-set/order specifications which specifies a second set of databases and directories to be searched only after the first tier described above has been searched with negative results (i.e., yielding less than N records).

Referring still to FIG. 4, while Rules-4 and 5 and corresponding sub-set/orders are not illustrated in detail, sub-functions related thereto are illustrated to provide additional examples of contemplated sub-functions. To this end, sub-function-4 specifies that if a search of sub-set/order-4 databases does not yield N records referenced by the DR, processor 68 will strip away one CQ from the search query and again search the databases specified by sub-set/order-4 for a relevant record. For example, if the search query specified a letter from Dr. Mendell to a patient identified by number 123456789 of Dec. 1, 1999 and no records were identified during a search of the sub-set/order-4 databases, sub-function-4 may require that the date modifier be removed from the search query and that the sub-set/order-4 databases be searched again.

Referring to FIG. 4, sub-function-5 specifies that if a search of sub-set/order-5 databases does not yield a record referenced by the DR, processor 68 will strip away one CQ from the search query and add another CQ to the search query, thereafter searching the databases specified by sub-set/order-5 for a record referenced by the new query. For example, if the search query specified a letter from Dr. Mendell to a patient identified by number 123456789 of Dec. 1, 1999 and no records were identified during a search of the sub-set/order-5 databases, sub-function-5 may require that the date modifier be removed from the search query, that a month modifier be added to the search query (i.e., the month modifier specifying the month of December in this example) and that the sub-set/order-5 databases be searched again.

Sub-function-6 specifies that any records returned from a search performed by a remote search processor (e.g., second processor 63) should be displayed for a system user to view and, if no records are returned, specifies that a message should indicate to the system user that no records were returned.

In addition to the sub-functions identified above, in a system that includes more than one search processor (e.g., see processors 24 and 63 in FIG. 1) and a search processor server (e.g., 69), each of the sub-functions in column 94 should also specify that if a CQ combination has been received from a search processor server 69, the results of any search should be sent directly to the search processor form which the CQ combination was initiated. For instance, assume that a CQ combination is received by second search processor 63 that search processor 63 does not support but that is supported by search processor 24. In this case second search processor 63 sends the CQ combination along with an indicator that second search processor initiated the query to search processor server 69. Server 69 then identifies search processor 24 as the processor that will likely support the CQ combination and transmits the combination and initiating processor (e.g., processor 63) indicator to processor 24.

When processor 24 receives the CQ combination and the initiating processor indicator, processor 24 stores the indicator and then applies searching rules table 76 to the CQ combination to find a satisfied rule, identifies a correlated sub-set/order of databases to be searched and then performs the search. As indicated above, after the search is completed processor 24 performs the sub-function associated with the satisfied rule and, in the case of a query from another search processor, the sub-function indicates that the search results should be sent back to the querying processor. Search results are then transmitted back to the initiating or querying processor as specified by the stored indicator. Many additional subfunctions are contemplated.

Figure 5:
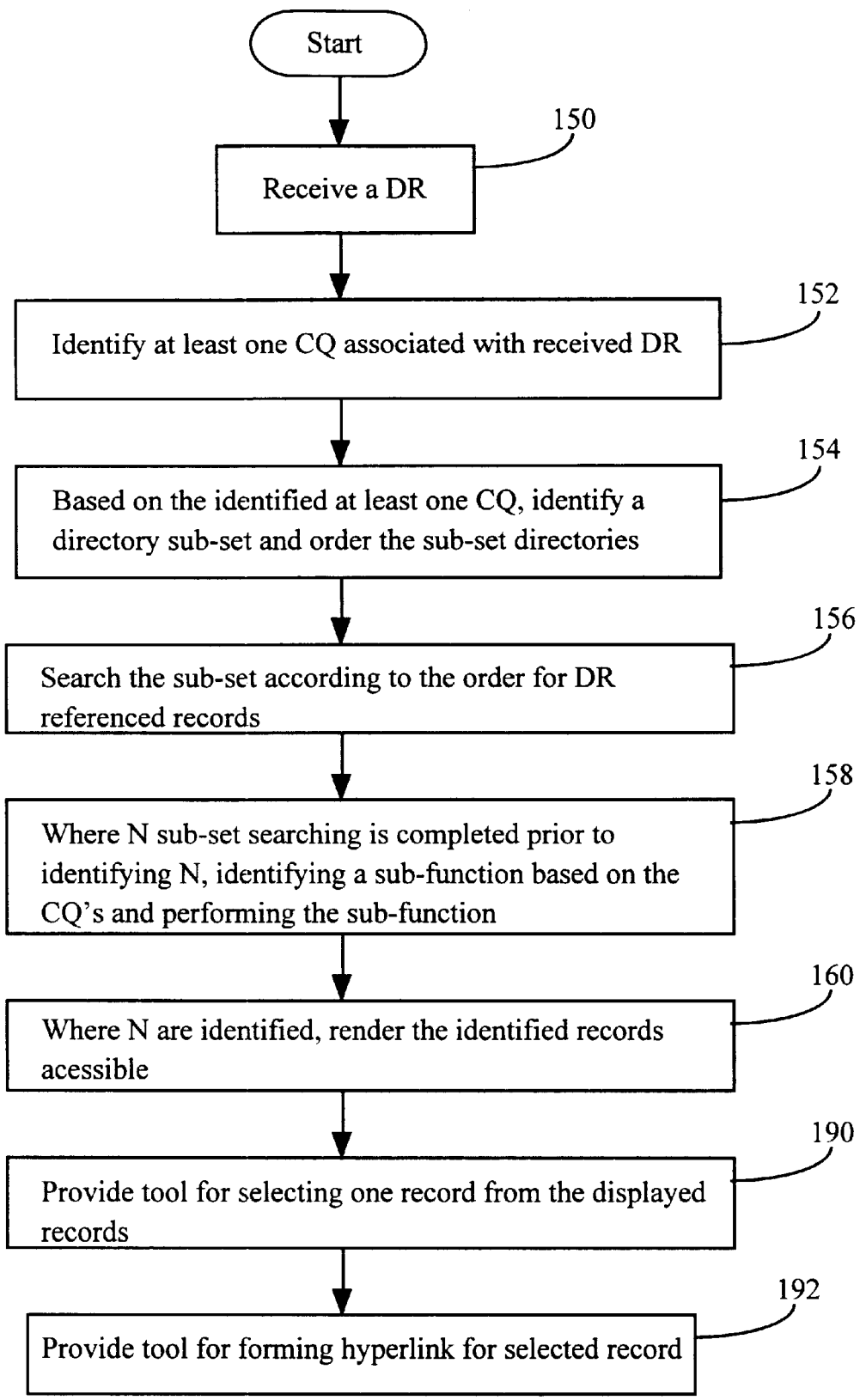
FIG. 5 is a flow chart illustrating a preferred inventive method.

Referring now to FIG. 5, an exemplary method according to the present invention is illustrated. Referring also to FIG. 1, in this example it will be assumed that Dr. Mendell uses workstation 14 (i.e., the community workstation) to specify a DR in an effort to locate a letter which was drafted by Dr. Mendell and which was created on Dec. 1, 1999. In this case, workstation 14 includes a display screen (not illustrated) on which a query box or field is provided and also includes an input device (e.g., a keyboard) which can be used to enter information into the query box. In order to use workstation 14 a user must log on with a password and therefore, initially Dr. Mendell logs onto workstation 14 by providing an ID that identifies the doctor.

After logging onto workstation 14 Dr. Mendell places a cursor within the query box and types in a query to search for the letter. In this example the query is "letter of Dec. 1, 1999 to Tom Jones." After the query is entered, search processor 24 at process block 150 receives the query.

Next, at process block 152, processor 68 attempts to identify at least one CQ associated with the received DR. To this end, referring also to FIGS. 2 and 3, when processor 68 receives the DR, processor 68 access CQ table 74 and begins to search the DR for each of the CCQs and NCQs listed in table 74. Processor 68 recognizes each of CCQ-1 (i.e., the term "letter"), CCQ-2 (i.e., a recipient, Tom Jones), CCQ-P (i.e., a date, Dec. 1, 1999) and NCQ-1 (a physician's identity, Dr. Mendell). The recipient identity may be identified in any of several different manners including comparing DR text to names of former patients, doctors, vendors, etc.

Referring also to FIG. 4, because processor 68 identified each of CCQ-1, CCQ-2, CCQ-P and NCQ-1, Rule-1 is satisfied and a search query consistent with the format specified by Rule-1 is constructed. In addition, at process block 154 processor 68 identifies a sub-set of directories and an order for the identified directories that will facilitate efficient database searching. To this end processor 68 accesses sub-set/order-1 and identifies the database sub-set and search order therefrom.

Continuing, at process step 156, processor 68 manages the searching task by cooperating with system servers to perform database and directory searches. To this end, processor 68 sends out a search packet to the servers one at a time specifying the databases and directories to be searched by each server, the search limit number (i.e., N) and the search query. When a server receives a search packet, the server identifies the packet information and begins to search the specified databases for records referenced by the search query. To this end it is assumed that either the search packet is in a format that is useable by the server for searching purposes or that each server is capable of disassembling the received search packet to identify information required for a search and then forming a search query itself to search the specified databases for relevant records. When either the entire database (and/or specified directory) has been searched or N records referenced by the query have been identified, the server sends the search results back to processor 68.

In the alternative, processor 68 may not be able to specify specific databases or directories to be searched but may be able to specify a server that likely is linked to databases and directories that will include relevant records. In this case the search packet would include the search limit number and the search query but would not specify the database or directories to be searched. After receiving the search packet, the specified server itself, based on the search query, identifies linked databases and directories to be searched for relevant records and then performs a search. Again, when either all of the databases (and/or directories) identified by the server have been searched or N records referenced by the query have been identified, the server sends the search results back to processor 68.

Next, processor 68 examines the search results to determine if N records were identified. If N records were identified, at process block 160 processor renders the N records accessible. Where less than N records were identified processor 68 forms another search packet to be sent to the server linked to the next directory to be searched. This next packet is similar to the first packet except that the search limit numbers will be N minus the number of records identified during the search of the first directory. When the packet is received the receiving server conducts a search for additional records referenced by the query. This process continues until either N records are identified or all directories/databases in the sub-set have been searched.

In the present example, referring again to FIG. 4, sub-set/order-1 specifies a searching order including Dr. Mendell's (i.e., the querying physician's) hard drive 13 followed by the local LAN databases 28, 30, 32. Thus, at block 156 processor 68 sends the first search packet to workstation 12 and workstation 12 searches hard drive 13 for a letter from Dr. Mendell to Mr. Tom Jones dated Dec. 1, 1999. After N records that fit this description are located or after the hard drive has been completely searched, workstation 12 sends the search results back to processor 68.

Assuming less than N records were located via the hard drive 13 search, processor 68 sends a second search packet to each of local LAN servers 18, 20 and 22. Servers 18, 20 and 22 simultaneously search linked databases 28, 30 and 32 and each returns results to processor 68. Note that when databases are on the same level of likelihood of including relevant records the databases can be searched simultaneously. In FIG. 5, at block 158, when less than N records are located via searching the database sub-set specified by sub-set/order-1, processor 68 identifies a sub-function to perform based on the search results. Referring also to FIG. 4, in this case the sub-function is sub-function-1.

In this case, consistent with sub-function-1 in FIG. 4 processor 68 indicates that no records were located during the search. In the alternative, referring to block 160, where at least one record has been identified, the record is rendered accessible via workstation 14 to Dr. Mendell.

While the examples described above and with reference to FIG. 4 assume a one-to-one relationship between CQ rules, sub-sets and sub-functions which can be implemented via a look-up table, other more complicated "artificial intelligence" based relationships between CCQ/NCQ combinations and sub-sets and sub-functions are contemplated. For example, processor 68 (see FIG. 2) may be equipped to recognize the general content of datatypes on specific linked databases and then, based on CCQ/NCQ combinations and the general content of databases, determine a likelihood that a relevant record might be stored on each specific database. In this case it is contemplated that the processor will be programmed with at least one and perhaps several threshold likelihoods. After determining likelihoods that databases/directories will include relevant records, it is contemplated that the processor will select the database/directory sub-set for searching by selecting sub-set databases/directories that have higher likelihoods that a threshold.

Similar "thresholding" is contemplated in the case of a second database/directory sub-set to be searched in the event that specific searching criteria (e.g., N records sought) are not met after searching a first sub-set. Thus, for example, where N records are sought but not located via searching of a first sub-set, processor 68 may be programmed to compare the likelihoods of including relevant records to a second threshold lower than the first and yet relatively high to select a second database/directory sub-set. Additional sub-function steps may be programmed and are a matter of administrative choice.

Figure 6:
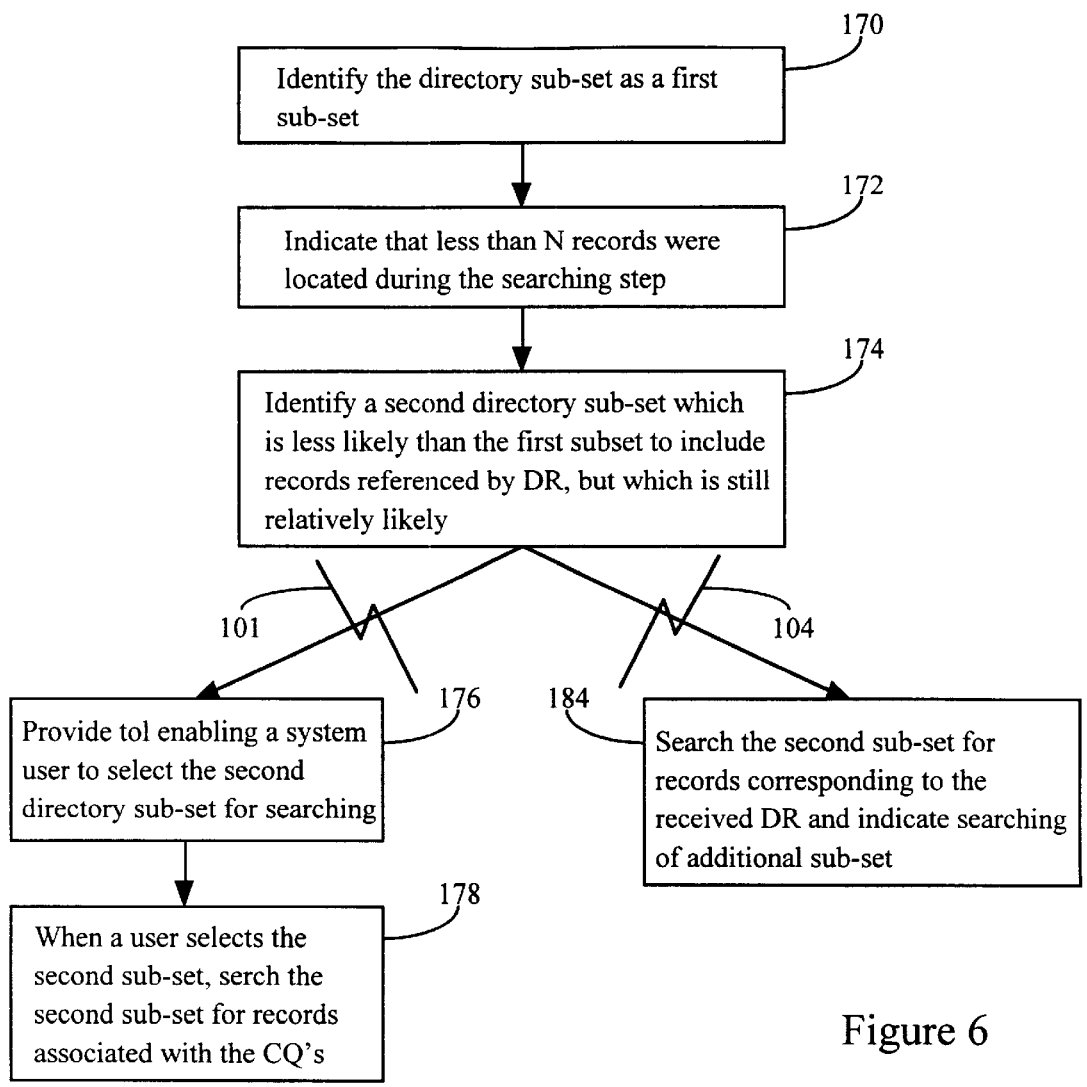
FIG. 6 is a flow chart illustrating various preferred sub-functions corresponding to the sub-function of FIG. 5.

Referring now to FIGS. 5 and 6 different sub-functions are illustrated in FIG. 6 which may occur after process block 156 in FIG. 5. In other words, instead of proceeding to block 160 in FIG. 5, in some embodiments of the invention the inventive process steps to block 170 in FIG. 6. Referring to block 170 and also to FIG. 4, the directory sub-sets specified in column 94 of table 76 are a first sub-set and the method of FIG. 6 contemplates a second sub-set of directories to be searched.

At block 172, assuming that X records were located during a search of the first sub-set of directories and that X is less than N, processor 68 indicates that X records were located by searching the first directory sub-set. At block 174 processor 68 identifies a second directory sub-set that is less likely than the first sub-set to include records referenced by the DR. In FIG. 6 the steps which follow step 174 follow two separate branches. The squiggly lines 101 and 103 each indicate a distinct path that may be programmed by a system administrator which is independent of the other paths. For example, either steps 176 and 178 or step 184 may be followed.

With respect to steps 176 and 178, at step 176 processor 68 enables a system user to select the second directory subset to be searched. To this end a descriptor of the second sub-set may be provided on a workstation display screen (not illustrated) along with a cursor selectable icon which authorizes additional searching. In effect processor 68 "suggests" the next logical database/directory sub-set to be searched. At block 178 if a user selects the second sub-set for searching processor 68 searches the second sub-set for DR referenced records. In the alternative, a cursor selectable icon may allow the user to view information about the X identified records which, when selected, causes processor 68 to display information about the X records on the display.

Referring to block 184 of FIG. 6, after the second database/directory sub-set has been identified in this sub-function processor 68 automatically searches the second sub-set and simply indicates to the querying physician that the second sub-set is being searched.

Another feature contemplated by the invention enables a physician to, after identifying a record via a specific DR, form a link between the DR and the record for future use. For example, assume four ECG reports have been generated for Tom Jones and that, when the DR "ECG report for Tom Jones" is entered into system 10 (see FIG. 1) via a workstation, processor 68 (see FIG. 2) returns a list including all four reports. As described above the physician can then access any of the four reports via hyperlinking or the like. Often, after selecting one of multiple listed entries, the entry selected will be referenced later by the same physician. To avoid having to observe the list of four reports again the invention allows the physician to effectively link the DR to the selected report so that when the same DR is provided the linked report is retrieved instead of the list of four reports.

Figure 7:
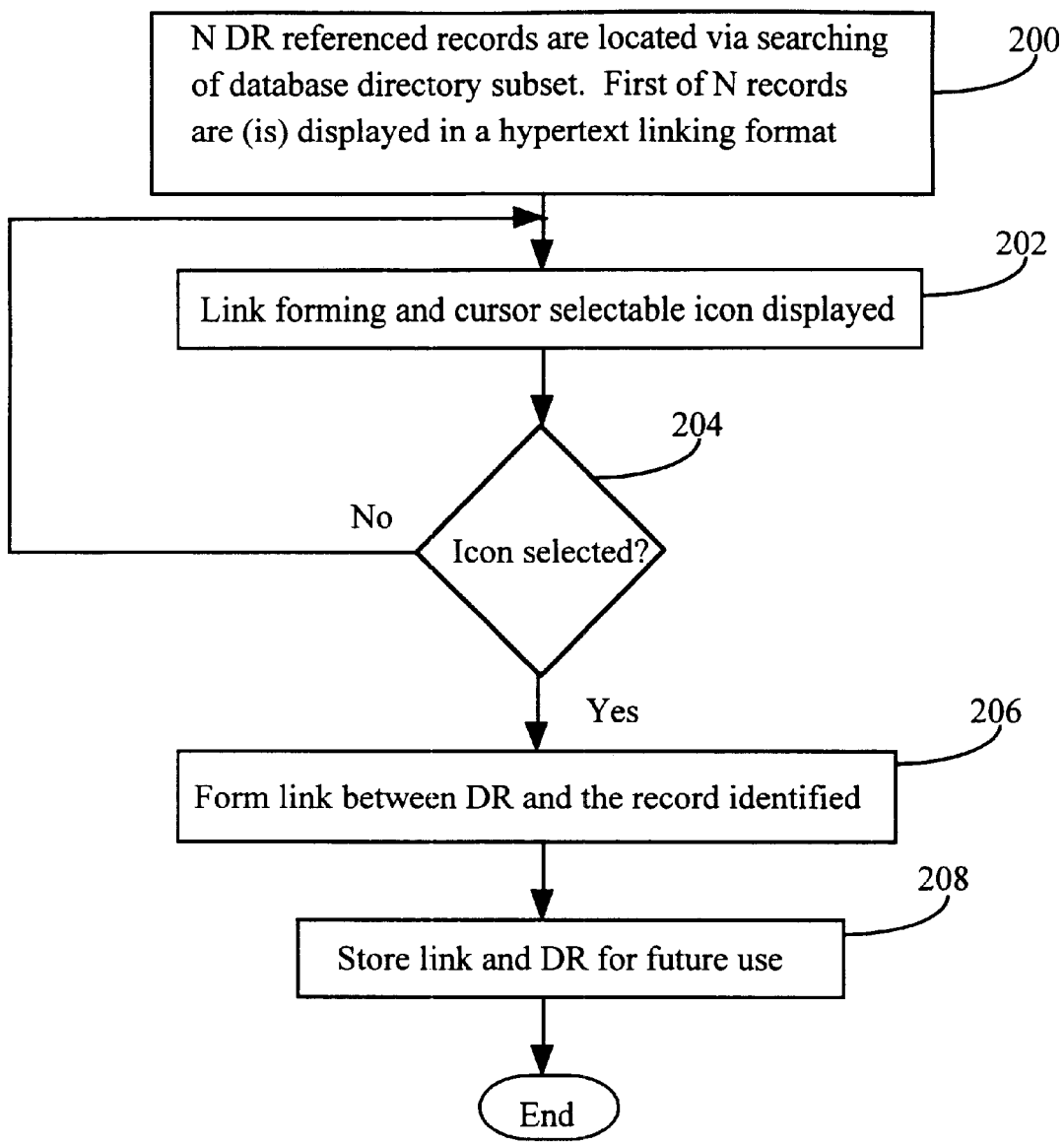
FIG. 7 is a flow chart illustrating a method according to the present invention.

To this end referring to FIG. 7, an inventive method is illustrated. Beginning at block 200, after N DR referenced records are located via searching of a database/directory sub-set, the list of N records is displayed in a hypertext linking format on a workstation screen. It is contemplated that one of the listed links can be indicated without selecting the record for retrieval. For example, a single click with a cursor over a link may highlight the link whereas a double click would actually select the link for retrieving a record.

In addition to displaying the list of N possible records a link forming and cursor selectable icon is also displayed at block 202. At block 204 processor 68 monitors the link forming icon and, when one of the list records is identified and the link forming icon is selected, processor 68 forms a link between the DR originally provided by the physician and the identified record at block 206. At block 208 processor 68 stores the correlated link and DR for future reference. Thereafter, if the physician again provides the same DR, processor 68 automatically renders the correlated record accessible.

It should be understood that the methods and apparatuses described above are only exemplary and do not limit the scope of the invention, and that various modifications could be made by those skilled in the art that would fall under the scope of the invention. For example, while several different searching rules are described above, others are contemplated which are particularly useful in certain applications. For instance, in many cases a DR may be qualifiable by several different CQs. In this case, if N records are sought and may more than N records corresponding to the DR are located, one preferred rule is to present only the N records which are most "qualified" to the querying physician.

For example, assume that a physician logs onto a workstation and enters a query "ECG report for George Thomas". In this example the DR may be "ECG report", one CQ may be "George Thomas", NCQs may include the physician's name, the date of the query, the medical facility at which the workstation resides, XML framing tags identifying a post-operation document section, etc.

In this case, referring again to FIG. 4, several different rules in column 90 may be satisfied by the query. It is contemplated that when several rules are satisfied the rule which qualifies the DR the most will be used to search for relevant records. Thus, assuming a first rule requires two CQs (e.g., patient's name and physician's name) and a second rule requires the same two CQs as the first rule (i.e., patient's name and physician's name) and a third CQ (e.g., post-operation XML framing tags), the second rule would be used to perform the search. In the event that the most qualifying rule does not yield N records after searching the databases associated with the second rule, the sub-function may be to use the first rule to search for additional relevant records.

In another embodiment, when several rules are satisfied each rule, sub-set/order and associated sub-functions may be used to search for relevant records to yield many relevant records. Thereafter the processor 68 may select a sub-set of identified records to be presented to the physician. The rule governing which sub-set records to be presented may be to present only the records corresponding to the most qualified search rules as above.

In addition, while the invention is described above as one wherein unsupported CQ combinations are transmitted to a search processor server (e.g., 69 in Fi. 1) to identify another search processor that likely supports the CQ combination, in another embodiment the first search processor (e.g., 24 in FIG. 1) may be capable of identifying other search processors itself instead of sending the CQ combination to a "clearing house" server like server 69. Other searching schemes are contemplated wherein the sub-set identification, ordering and searching tasks are shared differently among system processors, servers and the like.

According to yet another aspect of the invention, after a search and prior to presenting records to a querying physician, processor 68 may perform a "courtesy" search to make sure that each of the records identified in the search actually exists. For example, while a directory may indicate that 10 records exist in a database, in fact one of the records may have been deleted without updating the directory. By checking if records exist, better and more accurate search results are provided to the physician.

To apprise the public of the scope of this invention, the following claims are made:

What is claimed is:

1. A method to be used with a system including at least one processor linked to a plurality of databases on which records are stored, the records referenceable via data references (DRs), each DR associated with at least one characteristic qualifier (CQ), given a specific CQ, there are different relative likelihood's that a record referenced by a DR is stored on each separate database, the method for efficiently searching the databases for records referenced by a DR and comprising the steps of:

a) receiving a DR;

b) identifying at least one CQ associated with the received DR;

c) based on the identified at least one CQ, identifying an ordered database sub-set including databases having a likelihood of including records referenced by the DR which is greater than a threshold level, the databases ordered according to likelihood that the databases will include at least one record referenced by the DR;

d) searching the sub-set according to the order for DR referenced records;

e) where sub-set searching is completed prior to identifying N records, performing a first function; and f) where N records are identified, rendering the identified records accessible.

2. The method of claim 1 wherein the first function includes identifying a sub-function based on the CQs.

3. The method of claim 2 wherein the database sub-set is a first sub-set and the sub-function includes identifying a second database sub-set that is less likely than the first sub-set to include records referenced by the DR.

4. The method of claim 3 wherein the sub-function further includes indicating that less than N records were located during the searching step, enabling a system user to select the second database sub-set for searching and, when a user selects the second sub-set, searching the second sub-set for records associated with the CQs.

5. The method of claim 3 wherein the sub-function further includes searching the second sub-set for records corresponding to the received DR.

6. The method of claim 2 wherein the search results from searching the first database sub-set are a CQ.

7. The method of claim 2 wherein the database sub-set is a first sub-set and the sub-function includes determining the likelihood that a record referenced by a received DR may be included in a second database sub-set.

8. The method of claim 7 wherein the sub-function further includes, where likelihood that a record referenced by a received DR may be included in a second database sub-set is greater than a second threshold level, facilitating searching of the second sub-set.

9. The method of claim 1 where N is greater than 1 and wherein the first function includes, when at least one record is identified, rendering the identified record accessible.

10. The method of claim 9 wherein the first function further includes identifying a sub-function based on the CQs.

11. The method of claim 1 wherein the plurality of databases reside on linked local hard drives, local area networks, wide area networks and internet linked databases.

12. The method of claim 1 wherein the processor is a first processor and several other processors are linked to the first processor and the plurality of databases via a network and wherein at least one CQ corresponds to the processor used to generate the received DR.

13. The method of claim 12 wherein, for a given processor, the database sub-set includes at least one database that is relatively closely associated with the processor and the plurality of databases include other databases that are relatively more remotely associated with the processor and, wherein, the step of identifying a database sub-set includes identifying the at least one database that is closely associated with the given processor.

14. The method of claim 13 wherein the sub-set is a first sub-set, the at least one relatively closely associated database is stored in a memory linked directly to the processor and wherein the remotely associated databases include at least one local area network database linked to the processor via a local area network and the first function includes selecting at least a second database sub-set from the local area network databases and searching the second sub-set for at least one record referenced by the DR.

15. The method of claim 14 wherein the remotely associated databases further include at least one wide area network database linked to the processor via a wide area network and wherein the first function further includes, if N records are not identified after searching the first and second database sub-sets, selecting at least a third database sub-set from the wide area network databases and searching the third sub-set for at least one record referenced by the DR.

16. The method of claim 13 wherein the remotely associated databases include internet databases linked to the processor via the Internet and wherein the first function includes selecting at least a second database sub-set from the internet databases and searching the second sub-set for at least one record referenced by the DR.

17. The method of claim 16 wherein the first function further includes, prior to selecting a second database sub-set, based on the at least one CQ, determining a likelihood that at least one record referenced by the DR will be included in a second database sub-set, where the likelihood that at least one record referenced by the DR will be included in a second database sub-set exceeds a second threshold level, selecting a second sub-set.

18. The method of claim 1 wherein system user identity is known and user identity is a CQ.

19. The method of claim 18 wherein the databases include at least one separate database for each of a sub-set of system users and, wherein, the step of identifying a database sub-set includes identifying at least the database associated with a specific system user.

20. The method of claim 1 wherein, for at least one CQ the database sub-set includes only a local database closely linked to the processor.

21. The method of claim 1 wherein N is 1.

22. The method of claim 1 wherein the databases include at least one local database and at least one remote database and, wherein, when the sub-set includes each of the at least one local database and one remote database, the ordering step includes ordering the databases such that the local database precedes the remote database.

23. The method of claim 22 wherein the step of performing a first function includes indicating via the interface inability to identify a record referenced by the DR in the database sub-set.

24. The method of claim 23 wherein the processor is a local processor and the system further includes at least one remote processor, the at least one local database is searchable via the local processor and the at least one remote database is searchable via the remote processor and, wherein the step of searching the at least one local database is performed by the local processor and the step of searching the at least one remote database is performed by the remote processor.

25. The method of claim 1 wherein the system further includes at least one interface and the method further includes the step of, via the interface, facilitating provision of the DR.

26. The method of claim 25 wherein the step of facilitating provision includes providing a search field for entering a DR.

27. The method of claim 25 wherein a first record includes a plurality of segments and the interface is also for displaying at least a sub-set of the first record segments, other records included in the plurality of databases are second records and, wherein, the step of facilitating provision includes the steps of enabling a system user to select at least one first record segment via the interface and identifying the selected segment as the DR.

28. The method of claim 27 also for use in creating links between DRs in the first record and second records referenced by the first record DRs, to this end, the method further including the steps of, after facilitating access to at least one identified second record, enabling a system user to affirm a link between the DR in the first record and at least one identified second record and thereafter, creating a link between the DR in the first record and the identified second record.

29. The method of claim 28 wherein the identified second record is stored at a database address and wherein the step of creating a link includes distinguishing the DR in the first record and linking the DR in the first record to the second record address such that when the DR is subsequently selected in the first record, access to the second record is facilitated.

30. The method of claim 29 wherein the step of distinguishing the DR includes providing the DR in the first record in a format which is recognizable as a linking phrase.

31. The method of claim 28 wherein N is greater than 1, the first function includes rendering identified records accessible and a second function includes rendering the N records accessible, the steps of rendering records accessible include indicating each of the identified records on the interface and wherein the step of enabling affirmation of a link includes enabling a system user to select one of the indicated records to affirm a link between the DR in the first record and the selected second record.

32. The method of claim 1 wherein the system further includes an interface, N is greater than 1 and the method further includes the steps of enabling a system user to select one of the indicated records and, upon receiving an indication of one of the records, facilitating access to the selected record.

33. The method of claim 1 wherein at least one CQ is related to DR content.

34. The method of claim 27 wherein the CQs include content characteristic qualifiers CCQs which indicate at least one of the content of the DR and the content of the first record.

35. The method of claim 34 wherein the CQs include non-content characteristic qualifiers NCQs that indicate information about the DR other than DR content and first record content.

36. The method of claim 27 wherein the CQs include non-content characteristic qualifiers NCQs that indicate information about the record sought other than DR content and first record content.

37. The method of claim 35 wherein at least one NCQ comprises XML tags associated with the DR.

38. The method of claim 1 wherein the at least one CQ include s a plurality of CQs that form a CQ combination and the step of identifying a database sub-set includes identifying the sub-set based on the CQ combination.

39. The method of claim 1 wherein the process or is a first processor and the system includes at least one second processor and wherein the step of identifying a database sub-set includes the step of determining that the second processor is more suitable than the first processor to identify a database sub-set and perform a search for records referenced by the at least one CQ and using the second processor to perform the steps of identifying the sub-set and searching.

40. The method of claim 39 wherein the system also includes a search processor server that can, based on the at least one CQ, determine which of a plurality of second search processors is most suitable to identify the sub-set and search and wherein the step of identifying at least one second processor is performed by the search processor server.

41. The method of claim 1 wherein the processor is a first processor and the system also includes a second processor and wherein the first processor performs the step of receiving and the method further includes the steps of, after receiving, identifying the second processor to manage database searching and transmitting the DR to the second processor.

42. The method of claim 41 wherein the DR is included in a record and the entire record is transmitted to the second processor.

43. The method of claim 41 wherein the second processor indicates CQs to the first processor that may qualify the DR, the first processor searches for the CQs that may qualify the DR and, when CQs that may qualify the DR are identified, the identified CQs are transmitted back to the second processor and the second processor identifies the database sub-set as a function of the identified CQs.

44. The method of claim 1 further including the step of, prior to rendering, determining if the identified records exist.

45. The method of claim 44 wherein the rendering step includes rendering only the existing identified records accessible.

46. The method of claim 1 wherein the step of identifying an ordered database sub-set includes the steps of identifying the sub-set and then ordering the sub-set.

47. The method of claim 1 wherein the system includes a database that correlates the at least one CQ with additional correlated CQs and the step of identifying an ordered database sub-set includes the step of correlating the at least one CQ with additional correlated CQs and identifying an ordered database sub-set as a function of at least one of the additional correlated CQs.

48. A method to be used with a system including a processor linked to a plurality of databases on which records are stored, at least one local database linked relatively proximate the processor and at least one remote database linked relatively remote from the processor, the method for efficiently searching the databases for at least one record referenced by a DR and comprising the steps of:
   a) receiving a DR;
   b) searching at least a sub-set of the local database databases for a record referenced by the received DR;
   c) where N records are identified, skipping to step (e);
   d) searching at least a sub-set of the remote database databases for records referenced by the received DR; and
   e) rendering identified records accessible.

49. The method of claim 48 wherein N is 1.

50. The method of claim 48 wherein each DR is characterized by at least one characteristic qualifier (CQ), given a specific CQ, there are different relative likelihoods that a record referenced by a DR is stored on each separate database, prior to the step of searching remote databases, the method further including the steps of determining, based at least one CQ corresponding to the received DR, the likelihood that a record referenced by the DR will be included in a remote database, where the likelihood is less than a threshold level, skipping to step (e).

51. The method of claim 50 wherein at least one CQ includes DR content.

52. The method of claim 50 wherein the DR is provided via a processor and at least one CQ is processor identity.

53. The method of claim 50 wherein a system user provides the DR and at least one CQ is user identity.

54. The method of claim 50 wherein the DR is included in a first record and at least one CQ is record content.

55. The method of claim 50 wherein the DR is included in a first record that includes non-content characteristic qualifiers (NCQs) and at least one CQ is an NCQ.

56. The method of claim 48 wherein the at least one local database is stored in a memory linked directly to the processor, the processor is a first processor and the system further includes at least a second processor, the first processor linked to the at least one remote database via the second processor and, wherein the first processor performs the step of searching local databases and the step of searching remote databases includes causing the second processor to search the remote databases.

57. The method of claim 48 wherein the remote databases include at least first and second sub-sets, the first sub-set being linked proximate the processor relative to the second sub-set, the step of searching the remote database databases including searching the first sub-set, if N records are identified after searching the local and first remote sub-set databases, skipping to step (e) and if less than N records are identified after searching the local and first remote sub-set databases, searching the second sub-set for records referenced by the DR prior to step (e).

58. The method of claim 57 wherein the first sub-set includes databases linked to the processor via a local area network and the second sub-set includes databases linked to the processor via a relatively wider area network.

59. The method of claim 48 further including the step of, prior to searching the local database databases, identifying a sub-set of the local databases to be searched as a function of DR characteristics.

60. The method of claim 48 wherein the step of rendering includes the step of determining if identified records exist and rendering only existing identified records accessible.

61. A method to be used with a system including a processor linked to a plurality of databases on which records are stored, the records referenceable via data references (DRs), each DR associated with at least one non-content characteristic qualifier (NCQ), each NCQ qualifying an associated DR without being part of the DR content, given a specific NCQ, there are different relative likelihoods that a record referenced by a DR is stored on each separate database, the method for efficiently searching the databases for records referenced by a DR, the method comprising the steps of:
   a) receiving a DR;
   b) identifying at least one NCQ associated with the received DR;
   c) based on the identified at least one NCQ, identifying a database sub-set including databases having a likelihood of including records referenced by the DR which is greater than a threshold level;
   d) searching the sub-set for records referenced by the received DR;
   e) where N records are identified, rendering the N records accessible; and
   f) where the database sub-set is completely searched prior to N records being identified, performing a first function.

62. The method of claim 61 wherein the DR is provided via a processor and at least one NCQ is processor identity.

63. The method of claim 62 wherein the processor identity is the identity of the processor used to provide the DR.

64. The method of claim 62 wherein the processor identity is the identity of another processor linked to the system.

65. The method of claim 64 further including the steps of, prior to identifying the database sub-set, transmitting the DR to the another processor.

66. The method of claim 61 wherein a system user provides the DR and at least one NCQ is the user identity.

67. The method of claim 66 further including the steps of, when a user identity is identified, identifying a search processor that is typically used to perform searches for the user associated with the user identity and transmitting the DR to the search processor, the search processor performing the searching process.

68. The method of claim 61 further including the steps of, after identifying at least one NCQ, identifying additional information correlated with the identified NCQ and modifying the searching process as a function of the correlated information.

69. The method of claim 61 wherein the DR is included in a first record which is correlated with record description information and at least one NCQ includes the record description information.

70. The method of claim 61 further including the step of, prior to searching the sub-set, ordering the sub-set databases according to likelihood that the databases will include at least one record referenced by the DR and, wherein the step of searching includes searching the sub-set according to the order.

71. The method of claim 61 wherein N is 1.

72. The method of claim 61 wherein the first function includes identifying a sub-function based on the NCQs.

73. The method of claim 72 wherein the DR is also characterized by at least one content characteristic qualifier (CCQ) and the step of identifying a sub-function includes identifying the sub-function at least in part on the at least one CCQ.

74. The method of claim 61 wherein the DR is also characterized by at least one content characteristic qualifier (CCQ) and, wherein, the step of identifying a database sub-set includes basing identification of the sub-set at least in part on the at least one CCQ.

75. The method of claim 74 wherein at least one CCQ is DR content.

76. The method of claim 74 wherein the DR is included in a first record which includes record content and at least one CCQ is record content.

77. The method of claim 61 wherein the database sub-set is a first sub-set and the first function includes identifying a second database sub-set as a function of the NCQs which is less likely than the first sub-set to include records referenced by the DR and searching the second sub-set for records referenced by the DR.

78. The method of claim 61 wherein the processor is a first processor, at least one local database is directly accessible to the first processor, the system includes at least a second processor linked to the first processor and at least one remote database is accessible to the first processor via the second processor, when the sub-set includes the at least one local database the first processor searches the at least one local database and when the sub-set includes the at least one remote database the second processor searches the remote database.

79. The method of claim 78 wherein the first and second processors are linked via the internet.

80. A method to be used with a system including a processor linked to a plurality of databases on which records are stored, the records referenceable via data references (DRs), each DR associated with at least one characteristic qualifier (CQ), given a specific CQ, there are different relative likelihoods that a record referenced by a DR is stored on each separate database, the method for efficiently searching the databases for records referenced by a DR and comprising the steps of:

a) receiving a DR;

b) identifying at least one CQ associated with the received DR;

c) searching a first database sub-set for records referenced by the DR;

d) determining, as a function of the at least one identified CQ, if another database sub-set should be searched for records referenced by the DR;

e) if another sub-set is to be searched:
 1) identifying the another sub-set;
 2) searching the another sub-set for records referenced by the DR; and f) rendering identified records accessible.

81. The method of claim 80 further including the steps of, prior to searching the first database sub-set, based on the identified at least one CQ, identifying the first database sub-set including databases having a likelihood of including records associated with the at least one CQ which is greater than a threshold level.

82. The method of claim 80 wherein M is the number of records identified after searching the first database sub-set and M is also a CQ.

83. The method of claim 1 wherein the first function is to perform a sub-function based on the CQs and, for at least one CQ, the sub-function is to stop the search.

84. The method of claim 1 wherein N is 1, the step of receiving a DR includes receiving a query where the query includes a DR and identifying the DR, the step of identifying CQs includes identifying all CQs and the step of identifying a database sub-set includes identifying a database sub-set corresponding to the most qualifying set of the identified CQs.

* * * * *

UNITED STATES PATENT AND TRADEMARK OFFICE
CERTIFICATE OF CORRECTION

PATENT NO.    : 6,507,837 B1
DATED         : January 14, 2003
INVENTOR(S)   : Carlos de la Huerga It is certified that error appears in the above-identified patent and that said Letters Patent is hereby corrected as shown below:

<u>Column 28,</u>
Line 23, "include s" should be -- includes --.
Line 26, "process or" should be -- process or --.

Signed and Sealed this

Eighth Day of April, 2003

JAMES E. ROGAN
*Director of the United States Patent and Trademark Office*